US012627330B2

(12) United States Patent
Dunn

(10) Patent No.: US 12,627,330 B2
(45) Date of Patent: May 12, 2026

(54) SIMULTANEOUS TRANSMIT AND RECEIVE THROUGH ACTIVE CANCELLATION

(71) Applicant: Raytheon Company, Waltham, MA (US)

(72) Inventor: Zachary Dunn, Wylie, TX (US)

(73) Assignee: Raytheon Company, Arlington, VA (US)

( * ) Notice: Subject to any disclaimer, the term of this patent is extended or adjusted under 35 U.S.C. 154(b) by 424 days.

(21) Appl. No.: 18/310,614

(22) Filed: May 2, 2023

(65) Prior Publication Data

US 2023/0361807 A1 Nov. 9, 2023

Related U.S. Application Data

(60) Provisional application No. 63/338,938, filed on May 6, 2022.

(51) Int. Cl.
| | |
|---|---|
| *H04B 1/44* | (2006.01) |
| *H04B 1/04* | (2006.01) |
| *H04B 1/12* | (2006.01) |
| *H04B 1/405* | (2015.01) |

(52) U.S. Cl.
CPC .......... *H04B 1/405* (2013.01); *H04B 1/0483* (2013.01); *H04B 1/126* (2013.01)

(58) Field of Classification Search
CPC ........ H04B 1/006; H04B 1/02; H04B 1/0475; H04B 1/0483; H04B 1/16; H04B 1/126; H04B 1/40; H04B 1/44; H04B 7/0413
See application file for complete search history.

(56) References Cited

U.S. PATENT DOCUMENTS

| | | | |
|---|---|---|---|
| 7,202,812 | B2 | 4/2007 | Krikorian et al. |
| 8,041,363 | B2 | 10/2011 | Burchfiel |
| 8,175,535 | B2 | 5/2012 | Mu |
| 8,755,756 | B1 | 6/2014 | Zhang et al. |
| 9,479,214 | B2 | 10/2016 | Webb et al. |
| 9,553,712 | B2 | 1/2017 | Webb et al. |

(Continued)

OTHER PUBLICATIONS

Cummings, "Aperture-Level Simultaneous Transmit and Receive (STAR) with Digital Phased Arrays;" Dissertations, Master's Theses and Master's Report; Jan. 2020; 250 Pages.

(Continued)

*Primary Examiner* — Tuan Pham

(57) ABSTRACT

A simultaneous transmit and receive (STAR) system comprises a plurality of radiating elements and a plurality of antenna transmit/receive (T/R) elements. The plurality of antenna T/R elements are each in operable communication with a respective radiating element. Each T/R element comprises a transmit channel, a receive channel, a switch, and a directional coupler. The directional coupler comprises an RF input in operable communication with an antenna array receiving signals, an RF output coupling the received signals to an input of the receive channel, and a coupled input operably coupled to the switch. If the switch is set to a predetermined state, the respective transmit channel couples an active cancellation signal to the coupled input of the directional coupler to cancel at least some coupling effects arising on an input to the receive channel, arising from operation of at least some of the T/R elements in the array.

20 Claims, 17 Drawing Sheets

(56)  References Cited

U.S. PATENT DOCUMENTS

| | | | | |
|---|---|---|---|---|
| 9,882,603 | B2 * | 1/2018 | Wyville | .................... H04L 5/14 |
| 10,200,075 | B2 | 2/2019 | Gianvittorio et al. | |
| 10,393,859 | B2 | 8/2019 | Marr et al. | |
| 10,419,062 | B2 * | 9/2019 | Doane | ...................... H04B 1/44 |
| 10,627,463 | B2 | 4/2020 | Schillak et al. | |
| 10,693,564 | B2 | 6/2020 | Gianvittorio et al. | |
| 10,714,828 | B2 | 7/2020 | Parker et al. | |
| 2021/0013914 | A1 | 1/2021 | Judell | |

OTHER PUBLICATIONS

Hickle, "Providing Simultaneous Transmit and Receive Capabilities for Defense Systems;" Article from Microwave Journal; Jun. 14, 2021; 5 Pages.

Hovsepian, "Wideband, Scanning Array for Simultaneous Transmit and Receive (STAR);" Thesis Presented in Partial Fulfillment of the Requirements for the Degree Master of Science; Jan. 2017; 25 Pages.

Jorgesen, "How to Create a Simultaneous Transmit and Receive (STAR) Canceller Using Catalog Marki Components;" Blog posted Jul. 17, 2020 from https://www.markimicrowave.com/blog/star-canceller/; 5 Pages.

TX RX Systems Inc., "Primer on Directional Couplers;" Data Sheet retrieved from www.txrx.com on Apr. 27, 2023; 4 Pages.

* cited by examiner

Received Signal (Total) =
(Received Signal from target area) +
(Received Signal from Mutual Coupling) +
(Received Signal from TX feedback mode) =
(Received Signal from target area)

Figure 16:
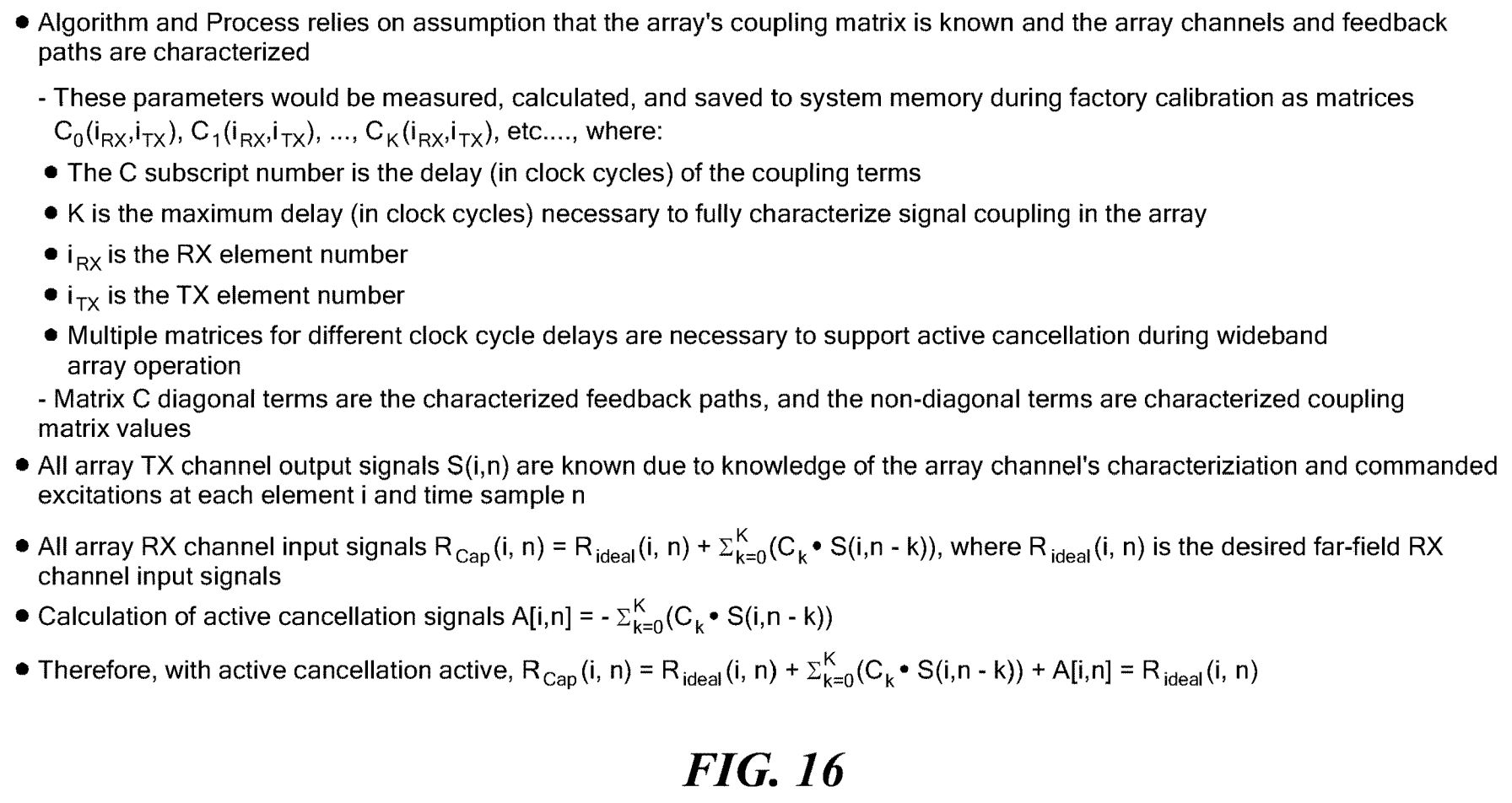

- Algorithm and Process relies on assumption that the array's coupling matrix is known and the array channels and feedback paths are characterized

- These parameters would be measured, calculated, and saved to system memory during factory calibration as matrices $C_0(i_{RX}, i_{TX}), C_1(i_{RX}, i_{TX}), ..., C_K(i_{RX}, i_{TX})$, etc..., where:

- The C subscript number is the delay (in clock cycles) of the coupling terms

- K is the maximum delay (in clock cycles) necessary to fully characterize signal coupling in the array

- $i_{RX}$ is the RX element number

- $i_{TX}$ is the TX element number

- Multiple matrices for different clock cycle delays are necessary to support active cancellation during wideband array operation

- Matrix C diagonal terms are the characterized feedback paths, and the non-diagonal terms are characterized coupling matrix values

- All array TX channel output signals $S(i,n)$ are known due to knowledge of the array channel's characteriziation and commanded excitations at each element i and time sample n

- All array RX channel input signals $R_{Cap}(i, n) = R_{ideal}(i, n) + \Sigma_{k=0}^{K}(C_k \bullet S(i, n - k))$, where $R_{ideal}(i, n)$ is the desired far-field RX channel input signals

- Calculation of active cancellation signals $A[i,n] = -\Sigma_{k=0}^{K}(C_k \bullet S(i,n - k))$

- Therefore, with active cancellation active, $R_{Cap}(i, n) = R_{ideal}(i, n) + \Sigma_{k=0}^{K}(C_k \bullet S(i,n - k)) + A[i,n] = R_{ideal}(i, n)$

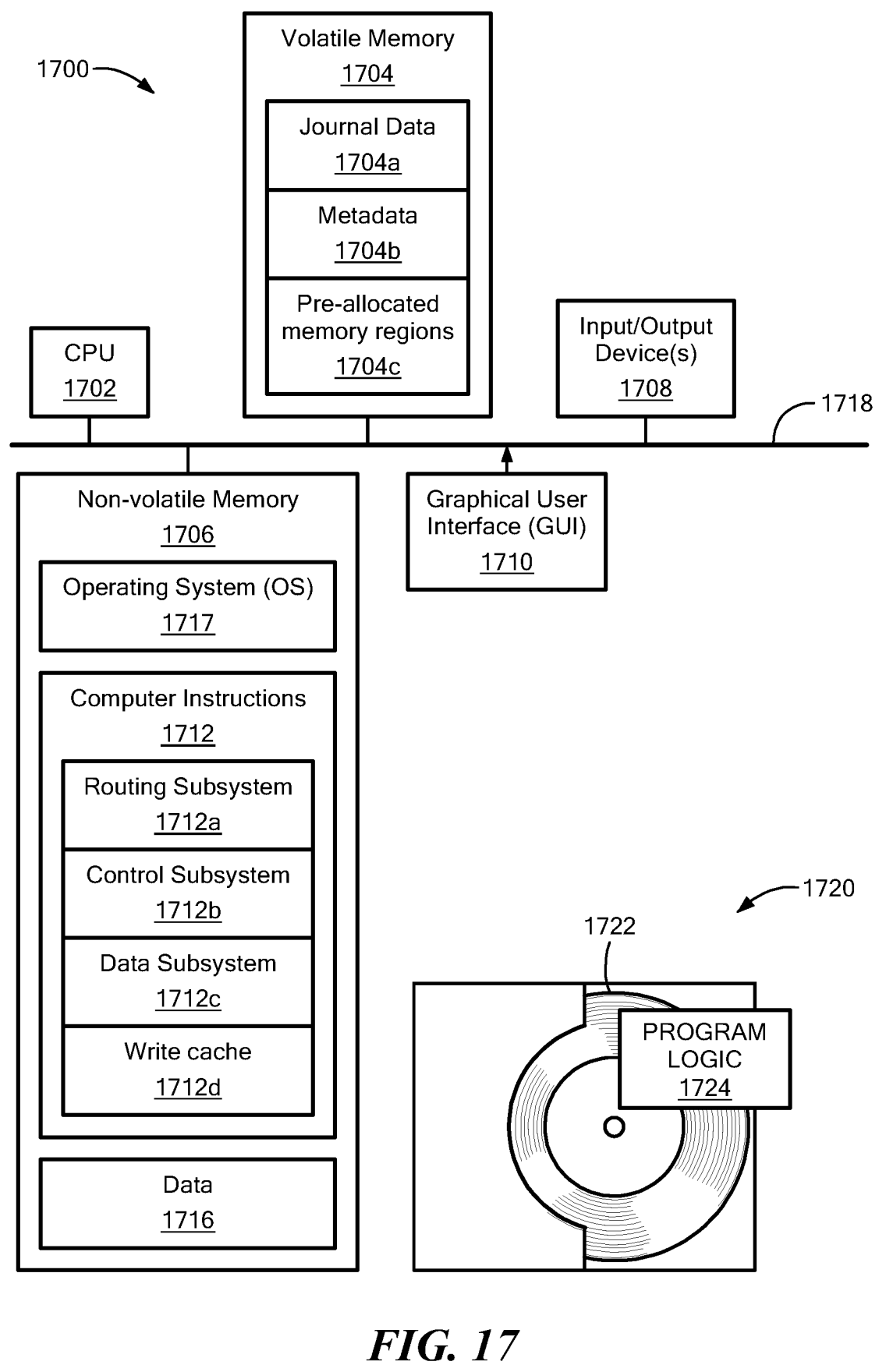

Volatile Memory
1704

Journal Data
1704a

Metadata
1704b

Pre-allocated memory regions
1704c

Input/Output Device(s)
1708

1718

CPU
1702

Non-volatile Memory
1706

Operating System (OS)
1717

Computer Instructions
1712

Routing Subsystem
1712a

Control Subsystem
1712b

Data Subsystem
1712c

Write cache
1712d

Data
1716

Graphical User Interface (GUI)
1710

1720

1722

PROGRAM LOGIC
1724

*FIG. 17*

SIMULTANEOUS TRANSMIT AND RECEIVE THROUGH ACTIVE CANCELLATION

CROSS-REFERENCE TO RELATED APPLICATIONS

This application claims the benefit of U.S. Provisional Application No. 63/338,938, filed May 6, 2022, and entitled "Simultaneous Transmit and Receive Through Active Cancellation," which is incorporated herein by reference in its entirety.

FIELD

Embodiments of the disclosure generally relate to devices, systems, and methods for transmitting and receiving electromagnetic waves. More particularly, the disclosure describes embodiments relating to devices, systems, and methods for transmitting and receiving simultaneously, such as in a radar system.

BACKGROUND

In various commercial or military systems that transmit and receive electromagnetic waves, such as communications systems or radar systems, it may be useful to transmit and receive simultaneously. This operation is known in the art as simultaneous transmit and receive (STAR) (also known in the art as same-frequency transmit and receive) or in-band full-duplex (IBFD)). STAR is becoming an area of increasing interest, especially for applications such as radars, communications, spectral sensing, etc. Transmitting and receiving at the same frequency is one way to optimize use of available bandwidth (e.g., doubling spectrum efficiency) and increase network throughput, which can be advantageous especially in defense systems.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

The ability for an antenna system and/or radar system to operate in STAR mode opens many possible applications and solutions that are otherwise impossible on a non-STAR capable system. However, in STAR systems, transmitting and receiving at the same frequency can present challenges, due to coupling of the transmitted signal into the receiver, and other types of in-band self-interference (SI), such as leakage, which can interfere with receiver operation, such as interfering with a receive signal that is weaker than the interfering transmitted signal. Various techniques are used in some STAR implementations to help provide ways to mitigate transmit-to-receive coupling and other types of self-interference. One factor hindering STAR operation is the antenna's transmit signal coupling back and compressing the receive signal path, removing most or all of the receiver's dynamic range. Effectively, in some instances STAR can create a self-jamming issue for the receiver.

For example, FIG. 1 is a simplified block diagram 100 of a prior art digital array architecture, showing a plurality of transmit channels 102a, 102b, 102c, 102d and a plurality of receive channels 103a, 104b, 104c, 104d, that together form a plurality of respective transmit and receive (T/R) elements 105a, 105b, 105c, 105d. The T/R elements 105 produce transmit signals 122a, 1222c, 122d. Each T/R element 105 is coupled through a respective isolating element 108 (e.g., a circulator), to a respective radiating element 110. For simplicity, other known components in the transmit and receive path, such as low noise amplifiers (LNAs), power amplifiers (PAs), filters, mixers, oscillators, and the like, are not shown in FIG. 1, but will be well understood by those of skill in the art.

Antenna transmit signals, especially in STAR systems, tend to couple and reflect back and compress their own receive signal paths. Consider T/R element 105b in FIG. 1. The receiver channel 104b of T/R element 105b receives an isolation path transmit signal 126, as well as the received signal 120 from the target area. As noted above, the received signal 120 often is weaker than the transmitted signal (e.g., 80-100 dB or more below the transmitted signal), but it can be difficult to provide enough isolation via isolation element 108b to prevent the transmitted signal from appearing stronger in the receiver channel 104 than the desired received signal. It can be necessary to have >100 dB isolation between Tx and Rx channels to achieve true STAR/IBFD operation, and this has been challenging to achieve in practice. Such transmitter interference can exceed the receiver's dynamic range by orders of magnitude, leading to issues that decrease dynamic range and sensitivity of the receiver, including problems such as intermodulation distortion (IMD), gain compression, and increased noise figure. In addition, it can be challenging to have enough isolation to deal with transmitter interference with high power array antennas, where transmitters may be operating near saturation, resulting in distortion and noise that may leak to the receiver.

Further, in an array architecture such as that of FIG. 1, a given receive chain is hindered not only by issues that arise from its own transmit path, as noted above, but also by the coupled TX signals from all the other adjacent transmitting elements, whose effect changes as a function of steering angle. Consider the coupling along the receive signal path for T/R element 105b in FIG. 1. As shown in FIG. 1, there is mutual coupling 124a-b, between T/R element 105a and 105b, mutual coupling 124c-b, between T/R element 105c and 105b, and mutual coupling 124d-b, between T/R element 105d and 105b. Because of mutual coupling between the antenna elements, each receive channel 104 may receive a portion of the transmit signal as the transmit signal is emitted through the transmit sub-array. As is understood in the art, mutual coupling can occur due to various factors, including, but not limited to, the power levels of the signals being transmitted, the proximity of antenna elements to each other, the positions and incident angles of transmit and receive beams, the particular shape and sidelobe levels of transmit and receive beams, etc. Thus, signals received in the receive channel 104 may include more than just the signal of interest from the far field, but also a number of unwanted features. This coupling inhibits antennas such that in the system of FIG. 1 from being able to operate in STAR mode with a receive dynamic range anywhere near receive-only mode. The mutual coupling and element receive isolation of transmit signals thus can cause compression and reduce the dynamic range of RX chains.

In certain embodiments, solutions are proposed to help alleviate at least some of these issues, especially those involving mutual coupling. One proposed solution involves the addition of a switch at the end of the transmit chain immediately prior to the TX/RX isolating element behind the antenna element, and the addition of a directional coupler at the end of the receive chain immediately prior the TX/RX isolating element behind the antenna element, so that when the new TX switch is placed into coupled mode, the full TX path's energy is directed into the new RX coupler so that the coupled signal only travels back through the RX path rather than toward the antenna element. Through the knowledge of an array's coupling matrix combined with a known characterization of the array's channels, the coupled TX energy onto any RX path can be quickly calculated for any array excitation. This calculated combined coupled TX waveform at a given RX element can then be recreated with a 180 degree phase shift by the element's transmit chain in feedback mode, which actively cancels the coupled TX waveform before the signal reaches the first RF amplifier in the RX chain. The end result is that the array as a whole can be transmitting while certain elements in the array set to RX mode do not experience the coupled signal within the RX chain, thus maintaining traditional RX-only mode sensitivity, effectively enabling STAR for the array.

Another proposed solution includes a further modification to the system architecture through the addition of a second TX chain that allows element-level STAR through effectively having a dedicated TX chain cancelling the coupled signals at each antenna element, allowing STAR as a standalone antenna or as a single element within an array architecture.

These and other solutions are described further below.

In one embodiment, a simultaneous transmit and receive (STAR) system is provided comprising a plurality of radiating elements and a plurality of antenna transmit/receive (T/R) elements. The plurality of radiating elements are configured as part of an antenna array, the antenna array configured for transmitting signals and for receiving signals. The plurality of antenna transmit/receive (T/R) elements are each in operable communication with a respective radiating element, each respective T/R element comprising a transmit channel, a receive channel, a switch, and a directional coupler. The directional coupler comprises a radiofrequency (RF) input in operable communication with the antenna array to receive signals collected by the antenna array, an RF output configured to couple the received signals to an input of the receive channel, and a coupled input in operable communication with the switch. If the switch is set to a first predetermined state, the respective transmit channel is configured to couple an active cancellation signal to the coupled input of the directional coupler, the active cancellation signal configured to cancel at least some coupling effects that arise on an input to the receive channel, the coupling effects arising from operation of at least a portion of the plurality of T/R elements in the array.

In some embodiments of the STAR system, the first predetermined state comprises a feedback state configured to couple an output of the respective transmit channel to a coupled input of the directional coupler. In some embodiments of the STAR system, if the switch is set to a second predetermined state, the second predetermined state configured to couple an output of the respective transmit channel to the respective radiating element. In some embodiments of the STAR system, a first subset of T/R elements have their respective switches set to the first predetermined state, wherein the first predetermined state comprises a feedback state configured to couple an output of the respective transmit channel to a coupled input of the directional coupler. In some embodiments of the STAR system, a second subset of T/R elements have their switch set to a second predetermined state, the second predetermined state configured to couple an output of the respective transmit channel to the respective radiating element.

In some embodiments of the STAR system, the switch comprises an input in operable communication with an output of the transmit channel, a transmit pole in operable communication with the respective radiating element, and a feedback pole in operable communication with the coupled input of the directional coupler. In some embodiments of the STAR system, if the switch is set to the transmit pole, an output of the transmit channel is provided to the respective radiating element, and if the switch is set to the feedback pole, the output of the transmit channel is provided to the coupled input of the directional coupler.

In some embodiments of the STAR system, the active cancellation signal is configured to enable the input to the receive channel to be as close a match as possible to the signal received at the antenna array. In some embodiments of the STAR system, the transmit channel input of at least a first T/R element of the plurality of T/R elements receives the active cancellation signal at substantially the same time that at least a second T/R element of the plurality of T/R elements receives a transmit signal to be provided to the second T/R element's respective radiating element, wherein the switch of the first T/R element is set to the feedback pole and the switch of the second T/R element is set to the transmit pole, and wherein the active cancellation signal at the first T/R element is configured to cancel at least one coupling effect that appears at the first T/R element and which is caused by the second T/R element.

In some embodiments of the STAR system, the active cancellation signal is generated based at least in part on a coupling matrix for the antenna array and on at least one characterization of at least one of the transmit and receive channels of the antenna array. In some embodiments of the STAR system, the active cancellation signal is generated based at least in part on one or more parameters out of a set of parameters measured and determined during a calibration of the array, the set of parameters comprising a maximum delay necessary to fully characterize signal coupling in the array, a receive element number, a transmit element number, one or more characterized feedback paths, one or more characterized coupling matrix values, knowledge of an array channel's characterization, knowledge of a commanded excitation for each antenna element at a given time sample, and one or more array channel transmit output signals.

In another aspect, another simultaneous transmit and receive (STAR) system is provided, comprising a plurality of radiating elements and a plurality of antenna transmit/receive (T/R) elements. The plurality of radiating elements are configured as part of an antenna array, the antenna array configured for transmitting signals and for receiving signals. The plurality of antenna transmit/receive (T/R) elements are each in operable communication with a respective radiating element, each respective T/R element comprising a first transmit channel, a second transmit channel, a receive channel, and a directional coupler. The first transmit channel has an input configured to receive a signal to be transmitted and an output configured to operably couple the signal to be transmitted to the respective radiating element. The second transmit channel has an input configured to receive an active cancellation signal and an output configured to operably couple the active cancellation signal to the directional coupler. The directional coupler comprises a radiofrequency (RF) input in operable communication with the antenna array to receive signals collected by the antenna array, an RF output configured to couple the received signals to an input of the receive channel, and a coupled input in operable communication with an output of the second transmit channel. The active cancellation signal is configured to cancel at least some coupling effects that arise on an input to the receive channel, the coupling effects arising from operation of at least a portion of the plurality of T/R elements in the array.

In some embodiments of the STAR system, the active cancellation signal is configured to enable the input to the receive channel to be as close a match as possible to the signal received at the antenna array. In some embodiments of the STAR system, the second transmit channel input receives the active cancellation signal at substantially the same time that that the first transmit channel receives the transmit signal. In some embodiments of the STAR system, the second transmit channel input of a first T/R element of the plurality of T/R elements receives the active cancellation signal at substantially the same time that a first transmit channel input of any T/R element of the plurality of T/R elements receives a transmit signal to be provided to the T/R element's respective radiating element, wherein the active cancellation signal at the first T/R element is configured to cancel at least one coupling effect that appears at the first T/R element and which is caused by any T/R element.

In some embodiments of the STAR system, the active cancellation signal is generated based at least in part on a coupling matrix for the antenna array and on at least one characterization of at least one of the transmit and receive channels of the antenna array. In some embodiments of the STAR system, the active cancellation signal is generated based at least in part on one or more parameters out of a set of parameters measured and determined during a calibration of the array, the set of parameters comprising a maximum delay necessary to fully characterize signal coupling in the array, a receive element number, a transmit element number, one or more characterized feedback paths, one or more characterized coupling matrix values, knowledge of an array channel's characterization, knowledge of a commanded excitation for each antenna element at a given time sample, and one or more array channel transmit output signals.

In a further aspect, a method for simultaneous transmit and receive (STAR) operation is provided. The method comprises configuring a plurality of radiating elements as part of an antenna array, the antenna array configured for transmitting signals and for receiving signals. The method also comprises coupling a plurality of antenna transmit/receive (T/R) elements to be in operable communication with the plurality of radiating elements, wherein, each respective T/R element is in operable communication with a respective radiating element, each respective T/R element comprising a first transmit channel, a receive channel, and a directional coupler, wherein, for each respective T/R element the directional coupler comprises a radiofrequency (RF) input in operable communication with the antenna array to receive signals collected by the antenna array, an RF output configured to couple the received signals to an input of the receive channel, and a coupled input in operable communication with the switch; and the switch comprises an input in operable communication with an output of the transmit channel, a transmit pole in operable communication with the respective radiating element, and a feedback pole in operable communication with the coupled input of the directional coupler.

The method also comprises setting, for at least a first of the plurality of T/R elements, the respective switch for that first T/R element, the respective switch of the first element to the transmit pole, to cause an output of the respective transmit channel of the first T/R element to be provided to the respective radiating element for the first T/R element. The method also comprises setting, for at least a second of the plurality of T/R elements, the respective switch for that second T/R element, to the feedback pole, to cause an output of the respective transmit channel of the second T/R element to be provided to the coupled input of the directional coupler. The method also comprises providing a transmit signal to an input of the transmit channel of the first T/R element, wherein the first T/R element provides the transmit signal to its respective radiating element to be radiated into a target area.

The method also comprises receiving, at the antenna array, a received signal from the target array, the received signal configured to be provided to an input of the receive channel of the second T/R element. The method also comprises providing an active cancellation signal to an input of the transmit channel of the second T/R element, wherein the directional coupler is configured to provide the active cancellation signal to the input of the receive channel of the second T/R element, wherein the active cancellation signal is configured to cancel at least some coupling effects that arise on the input to the receive channel of the second T/R element, the coupling effects arising from providing the transmit signal to the first T/R element.

In further embodiments of the method for STAR operation, the active cancellation signal is provided as an input to the transmit channel of the second T/R element at substantially the same time that the transmit signal is provided as an input to the transmit channel of the first T/R element. In further embodiments of the method for STAR operation, the active cancellation signal is configured to enable the input to the receive channel to be as close a match as possible to the signal received at the antenna array. In further embodiments of the method of STAR operation, the active cancellation signal is generated based at least in part on a coupling matrix for the antenna array and on at least one characterization of at least one of the transmit and receive channels of the antenna array.

In further embodiments of the method of STAR operation, the active cancellation signal is generated based at least in part on one or more parameters out of a set of parameters measured and determined during a calibration of the array, the set of parameters comprising a maximum delay necessary to fully characterize signal coupling in the array, a receive element number, a transmit element number, one or more characterized feedback paths, one or more characterized coupling matrix values, knowledge of an array channel's characterization, knowledge of a commanded excitation for each antenna element at a given time sample, and one or more array channel transmit output signals.

In still another aspect, another method for simultaneous transmit and receive (STAR) operation is provided. The method comprises configuring a plurality of radiating elements as part of an antenna array, the antenna array configured for transmitting signals and for receiving signals. The method also comprises coupling a plurality of antenna transmit/receive (T/R) elements to be in operable communication with the plurality of radiating elements, wherein, each respective T/R element is in operable communication with a respective radiating element, each respective T/R element comprising a first transmit channel, a second transmit channel, receive channel, a switch, and a directional coupler, wherein, for each respective T/R element, the first transmit channel has an input configured to receive a signal to be transmitted and an output configured to operably couple the signal to be transmitted to the respective radiating element; the second transmit channel has an input configured to receive an active cancellation signal and an output configured to operably couple the active cancellation signal to the directional coupler; and the directional coupler comprises a radiofrequency (RF) input in operable communication with the antenna array to receive signals collected by the antenna array, an RF output configured to couple the received signals to an input of the receive channel, and a coupled input in operable communication with an output of the second transmit channel.

The method also comprises providing a transmit signal to an input of the first transmit channel of the T/R element, wherein the first T/R element provides the transmit signal to its respective radiating element to be radiated into a target area. The method also comprises receiving, at the antenna array, a received signal from the target array, the received signal configured to be provided to an input of the receive channel of the first T/R element. The method also comprises providing an active cancellation signal to an input of the second transmit channel of the first T/R element, wherein the directional coupler is configured to provide the active cancellation signal to the input of the receive channel of the first T/R element, wherein the active cancellation signal is configured to cancel at least some coupling effects that arise on the input to the receive channel of the first T/R element, the coupling effects arising from providing the transmit signal to any T/R element in the plurality of T/R elements.

In some embodiments, the method for STAR operation further comprises providing an active cancellation signal to an input of the second transmit channel of the first T/R element, wherein the directional coupler is configured to provide the active cancellation signal to the input of the receive channel of the first T/R element, wherein the active cancellation signal is configured to cancel at least some coupling effects that arise on the input to the receive channel of the first T/R element, the coupling effects arising from providing the transmit signal to the first T/R element.

In some embodiments, the active cancellation signal is provided as an input to the second transmit channel of the first T/R element at substantially the same time that the transmit signal is provided as an input to the first transmit channel of the first T/R element. In some embodiments, the active cancellation signal is configured to enable the input to the receive channel to be as close a match as possible to the signal received at the antenna array. In some embodiments, the active cancellation signal is generated based at least in part on a coupling matrix for the antenna array and on at least one characterization of at least one of the transmit and receive channels of the antenna array.

In some embodiments, the active cancellation signal is generated based at least in part on one or more parameters out of a set of parameters measured and determined during a calibration of the array, the set of parameters comprising a maximum delay necessary to fully characterize signal coupling in the array, a receive element number, a transmit element number, one or more characterized feedback paths, one or more characterized coupling matrix values, knowledge of an array channel's characterization, knowledge of a commanded excitation for each antenna element at a given time sample, and one or more array channel transmit output signals.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 16 is an overview of an exemplary algorithm that is implemented as part of the flow chart of FIG. 15, in accordance with one embodiment; and FIG. 17 is a block diagram of an exemplary computer system usable with at least some of the systems, apparatuses, and methods of FIGS. 2-15, in accordance with one embodiment.

The drawings are not to scale, emphasis instead being on illustrating the principles and features of the disclosed embodiments. In addition, in the drawings, like reference numbers indicate like elements.

DETAILED DESCRIPTION

Figure 1:
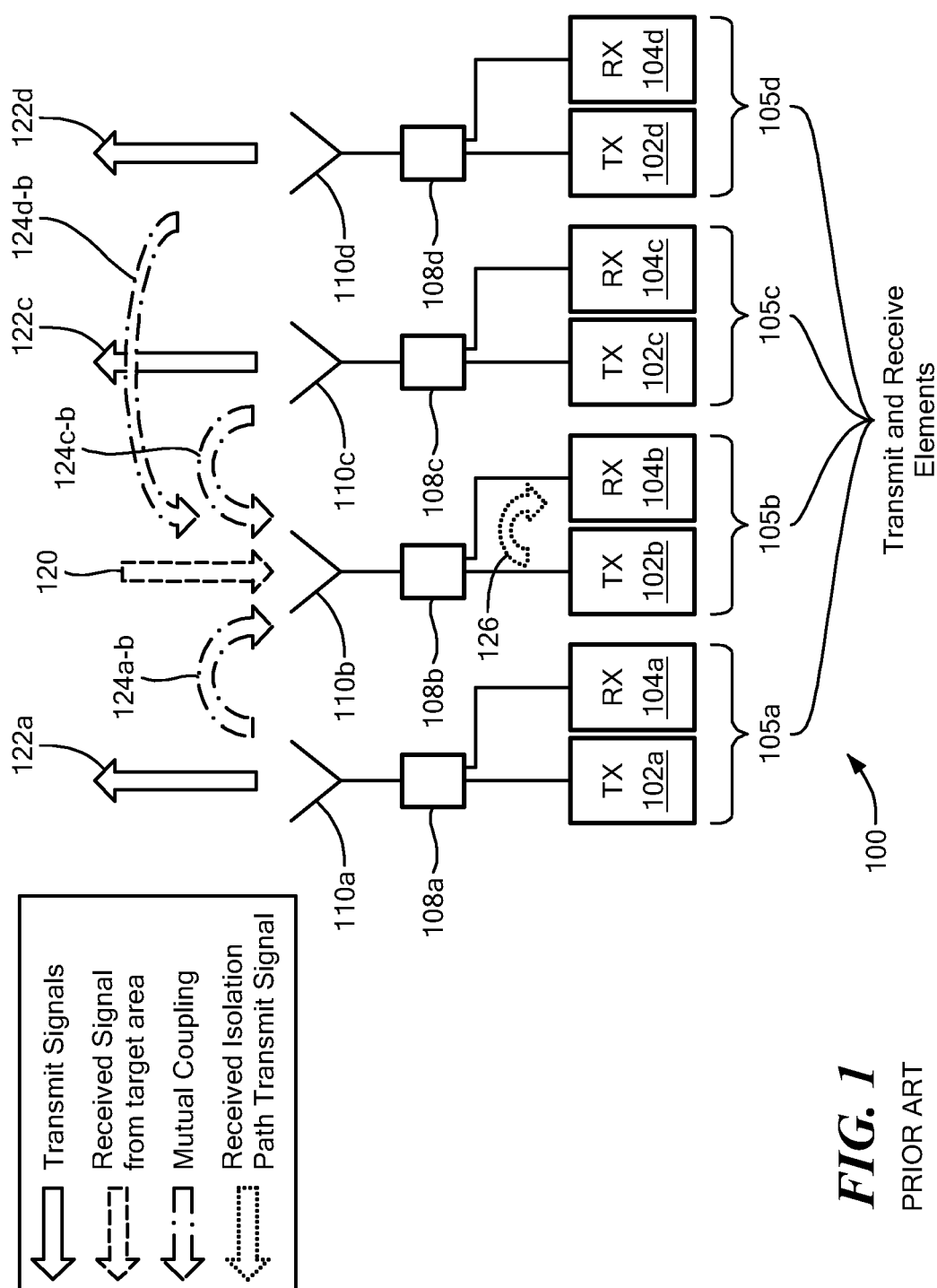
FIG. 1 is a simplified block diagram of a prior art digital array architecture, in accordance with one embodiment.

Before describing details of the particular systems, devices, and methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

In addition, the following detailed description is provided, in at least some examples, using the specific context of target detection systems (e.g., radar systems) configured to detect, track, monitor, and/or identify targets, where targets can include (but are not limited to) aircraft (both unmanned and manned), unmanned aerial vehicles, unmanned autonomous vehicles, robots, ships, spacecraft, automotive vehicles, and astronomical bodies, or even birds, insects, and rain. At least some embodiments herein are usable with any systems involved with any radar applications, including but not limited to military radars, air traffic control radars, weather monitoring radars, etc. Those of skill in the art will appreciate that the embodiments described herein are applicable to many types of systems as well, including but not limited to wireless communications of all kinds, optical systems, vehicle automation and/or self-driving car support, factory automation, laboratory test equipment, medical imaging, audio and video compression, any systems that include digital transceivers, and any systems subject to signal interference.

In addition, it is noted that various connections are set forth between elements in the following description and in the drawings. These connections in general and, unless specified otherwise, may be direct or indirect, and this specification is not intended to be limiting in this respect. In this disclosure, a coupling between entities may refer to either a direct or an indirect connection. It should be understood that throughout the drawings, corresponding reference numerals indicate like or corresponding parts and features. As used herein, the term module, unit and/or element can be formed as processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Additionally, use of the term "signal" in conjunction with this disclosure is not limited to analog and/or digital signals but rather is meant to denote as well (1) the mathematical description of any measurable phenomena in nature or in human-made systems and (2) the mathematically described function of one or more variable depending on one or more parameters. Examples of types of signals which are encompassed in the embodiments described herein include, but are not limited to, light intensity, voltage, pressure, electromagnetic radiation (including radio waves), magnetic field strength and electric field strength.

Figure 2:
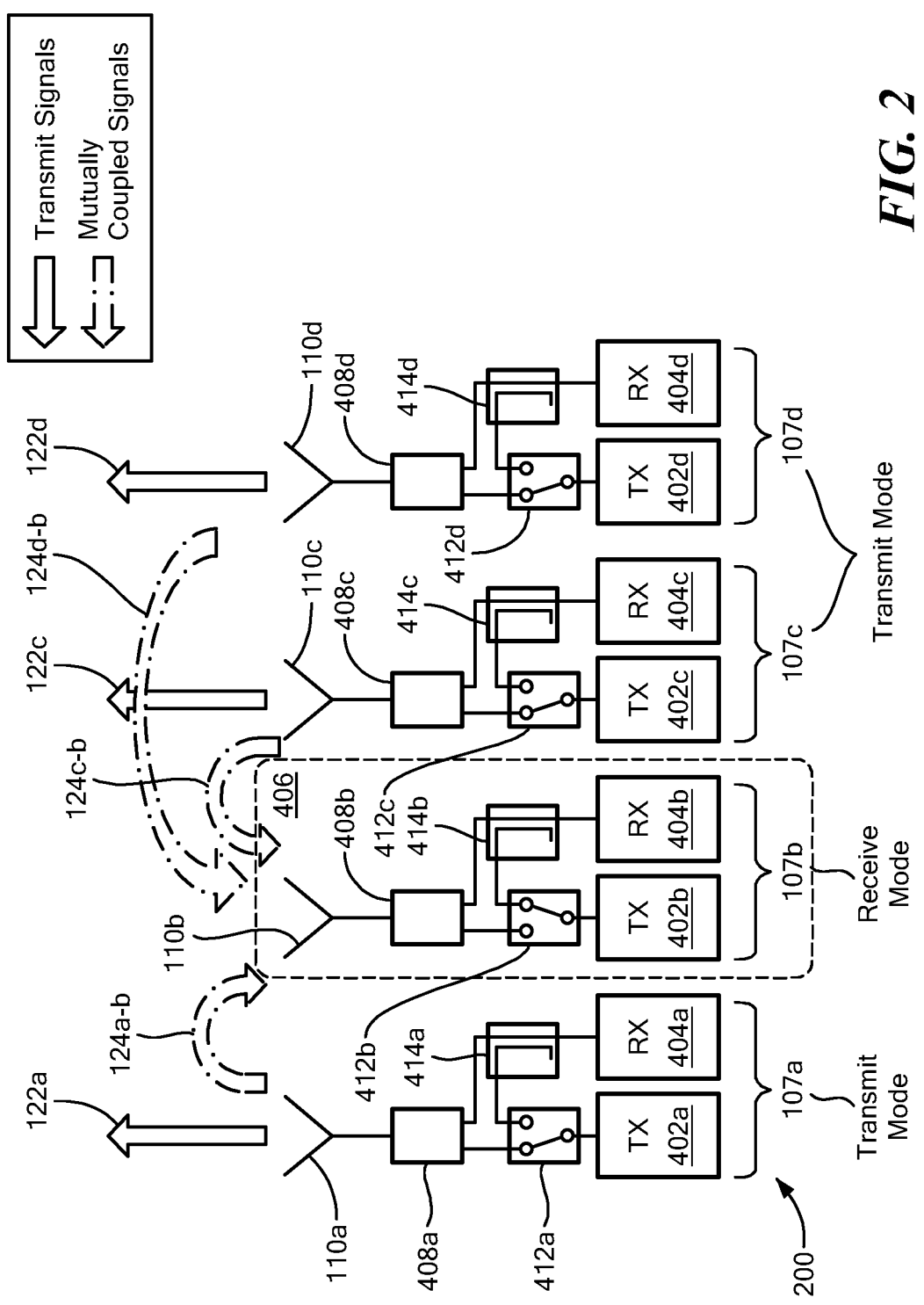
FIG. 2 is a simplified block diagram of a first modified digital array architecture, in accordance with one embodiment.
Figure 3:
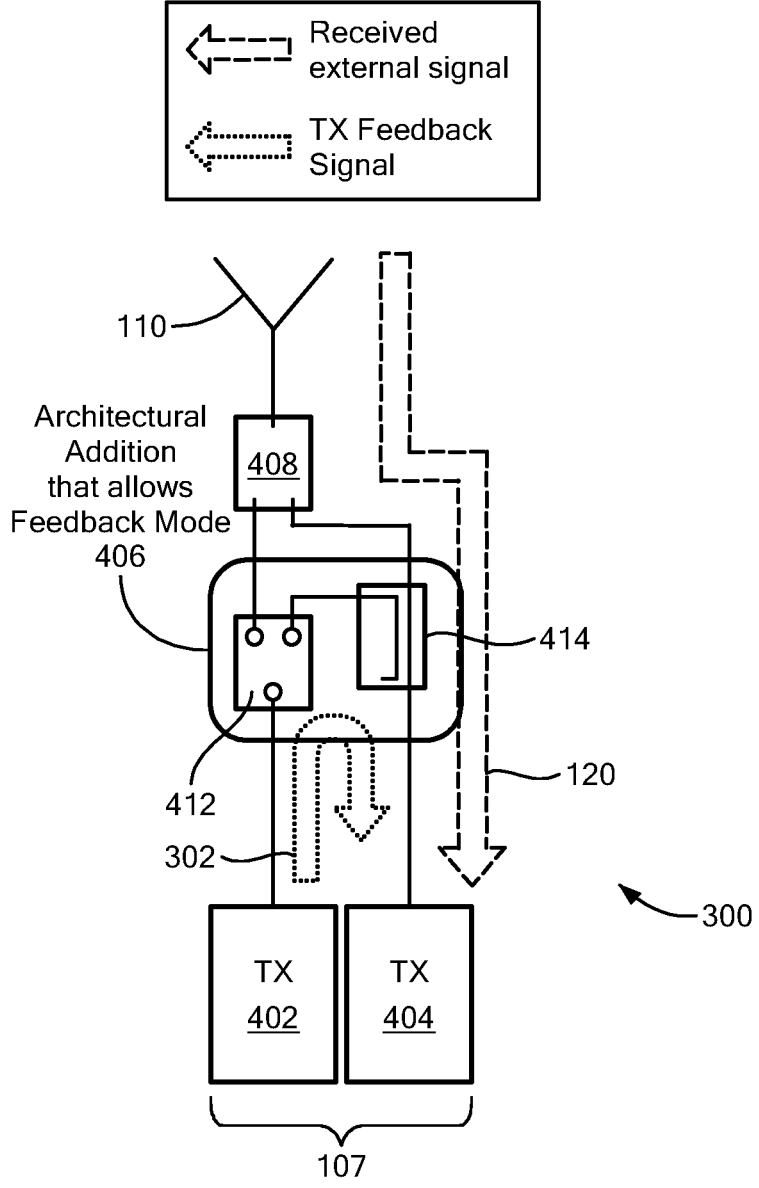
FIG. 3 is a simplified block diagram showing a more detailed view of an architectural addition to the transmit/receive (T/R) elements of FIG. 2, in accordance with one embodiment.

FIG. 2 is a simplified block diagram of a first modified digital array architecture 200, in accordance with one embodiment. In certain embodiments, the modified digital array architecture 200, in combination with a process and algorithm as described further herein, help to reduce or eliminate the effects of transmitter coupling on the receiver, especially coupling between transmit/receive (T/R) elements. The modified digital array architecture 200 includes a plurality of T/R elements 107*a*-107*d*. FIG. 3 is a simplified block diagram 300 showing a more detailed view of an architectural addition to a given T/R element. Referring to FIGS. 2 and 3, each T/R element 107 includes a transmit (TX) channel 402, a receive (RX) channel 404, a feedback mode subcircuit 406, an isolation component 408, and a radiator 110 (antenna radiating element). For simplicity, other known components in the transmit and receive path, such as LNAs, low noise amplifiers (LNAs), PAs, amplifiers, filters, mixers, oscillators, and the like, are not shown in FIGS. 2-3, but will be well understood by those of skill in the art.

The feedback mode subcircuit 406 provides an architectural addition to the T/R element 107 to allow a feedback mode of operation to be implemented, as desired, on selected T/R elements 107 in the array. The architectural additions includes addition of a feedback/transmit switch 412 at the end of TX channel 402 immediately prior to TX/RX isolating component 408 behind the antenna radiator 410 and addition of a directional coupler 414 on the RX channel 404. The feedback/transmit switch 412 has an input in operable communication with the output of the transmit channel 402, and has two poles, a feedback pole and a transmit pole, corresponding, respectively, to two possible modes of operation for the feedback/transmit switch 412: feedback mode (illustrated, for example, in FIG. 5, discussed further below) and transmit mode (illustrated, for example, in FIG. 6, discussed further below). The directional coupler 414 has a coupled input in operable communication with the "feedback mode" pole of the feedback/transmit switch 412, a radiofrequency (RF) input in operable communication with the antenna 410 (via port 2 of the circulator 408), and an RF output in operable communication with the input of the receive channel.

This architectural change enables a given T/R element 107 to operate, at any time, in feedback mode (also referred to herein as "coupled mode"), where, in certain embodiments, the T/R element 107 can be configured to operate in feedback mode periodically, randomly, upon the occurrence of a specific condition, all the time, some of the time, or in accordance with any operational requirements. In feedback mode, the output of the TX channel 402 is directly injected into the input of the RX channel 404 without radiating, while still allowing the RX channel 404 to receive radiated signals captured by the antenna 410. In particular, when the TX switch 412 is placed into feedback/coupled mode (e.g., as shown with switch 412*b* of FIG. 2), the full energy of the TX channel 402*b*'s path is directed into the directional coupler 414*b*. Thus, the coupled signal from the TX channel 402*b*'s path (i.e., TX feedback signal 302) only travels back toward the receiver 404*b*, rather than towards the antenna element 410. This enables the RX channel 404*b* to still receive the radiated signals (e.g., received external signal 120 of FIG. 3, from the far field) captured by the antenna 410*b*. Although not shown in FIG. 4, those of skill in the art will appreciate that the feedback/transmit switch 412, in certain embodiments, is under external control, such as by an external computer system (not shown) and/or by the transmit channel processing 446.

Note in FIG. 2 that T/R elements 107*a*, 107*c*, and 107*d*, are operating in transmit mode, but T/R element 107*b* is operating in receive mode. Also, the T/R element 107*b* is also receiving mutually coupled signals from T/R elements 107*a*, 107*c*, and 107*d* (similar to the mutually coupled signals shown in FIG. 1). However, as discussed further below, these mutually coupled TX signals 124*a-b*, 124*b-c*, 124*d-b* into any RX channel can be quickly calculated for every element for any array excitation, assuming that the coupling matrix for the array is known and that the array channels and feedback paths are characterized (e.g., in advance, during calibration, as discussed further herein). This calculated combined coupled TX waveform at a given RX element 404 can then be recreated with a 180 degree phase shift by the element's transmit chain in feedback mode, which actively cancels the coupled TX waveform before the signal reaches the first RF amplifier in the RX chain.

That is, for an element in feedback/coupled mode (e.g., T/R element 107*b* in FIG. 2), the TX signal being sent on that respective transmit channel 402*b* that is going to be directly injected into the input of the RX channel 404*b* of the T/R element 207*b*, is not necessarily the same as the signal being sent out at the same time on any of the other transmit channels 402*a*, 402*c*, 402*d*. Rather, the TX signal being sent on the transmit channel 402*b* of an element in feedback/coupled mode, is pre-configured (i.e., generated in advance) to be a unique type of transmit signal that will provide active cancellation of the mutual coupling caused by the elements adjacent to the element 107*b* that is in feedback/coupled mode.

At least some embodiments herein are configured to be implemented in a digital array architecture, so every element has independent waveform generation capability. The coupling relationship between all elements (and thus, any combination of elements due to the linear relationship) is known beforehand, as are the commanded TX signals on all TX channels (because the system is commanding them). Thus, with the coupling relationship and all excitations known, the full combined coupled signal at any RX element can be quickly calculated. In some embodiments, RX and TX elements can be assigned arbitrarily across the array to be either in transmit mode or receive and feedback mode, and reassigned at any time, and unique active cancellation calculations are computed simultaneously for all elements currently in RX mode on a sample by sample basis. In certain embodiments, the RX elements are the only ones to have active cancellation signals output on their TX chains (because they are in feedback mode); all the other (TX) elements transmit the signals necessary to create the desired far-field RF signals with their RX elements ignored.

Effectively, it is known what the combined mutually coupled signal and associated active cancellation signal should be for any receive path prior to actually receiving coupled signals, because the commanded TX signal set for the array is known in advance along with the array coupling between all combinations of array elements, so there is no time delay in having to wait for the actual signal return to then determine a cancellation, as sometimes has to happen in other techniques. Instead, the cancellation can be active, dynamic, and implemented instantaneously for every element on a sample by sample timeframe while in the analog domain, so no post processing is needed for cancelling out the mutual coupled signals. Being able to perform cancellation in the analog domain, before receiver processing (e.g., prior to the LNA 453 of FIG. 4, discussed further herein) means that there is no clipping or compression of the received chain due to the unwanted coupled signals, so dynamic range of the RX chain is maintained.

Thus, the TX signal being sent on the transmit channel 402*b* of the element in feedback/coupled mode (e.g., element 107*b*) is calculated and generated to equal the combined mutually coupled TX waveforms at that RX element with a 180 degree phase shift, so that when it is added to the actual waveform being received a the input to the RX channel 404*b*, it destructively interferes with the coupled TX waveform portion of the signal going into the receive channel before the received signal reaches the first RF amplifier in the RX chain. As will be understood, in certain embodiments, the feedback signal is intentionally combined with the RX signal prior to any RX LNAs so that the linearity and sensitivity of the LNAs (and RX chain as a whole) is preserved. In certain embodiments, along with being 180 degrees out of phase, the magnitude of the active cancellation signal must equal the magnitude of the combined coupled signal. In embodiments where there is a digital aperture with a high fidelity waveform generator at every element, amplitude control should not be an issue. As will be understood, in some embodiments, due to architecture and directional coupler loss, an amplifier may even be needed on the feedback path; however, the effect of addition of such an amplifier, in certain embodiments, is addressed during characterization of the array paths (discussed further herein in connection with FIG. 15, block 1520), because the TX path and feedback paths need accurate characterization in order for accurate active cancellation signal injection.

The end result is that the array as a whole can be transmitting while certain elements in the array set to RX mode do not experience coupled TX signals within their RX chains, thus maintaining traditional RX-only mode sensitivity and effectively enabling STAR for the array.

Figure 4:
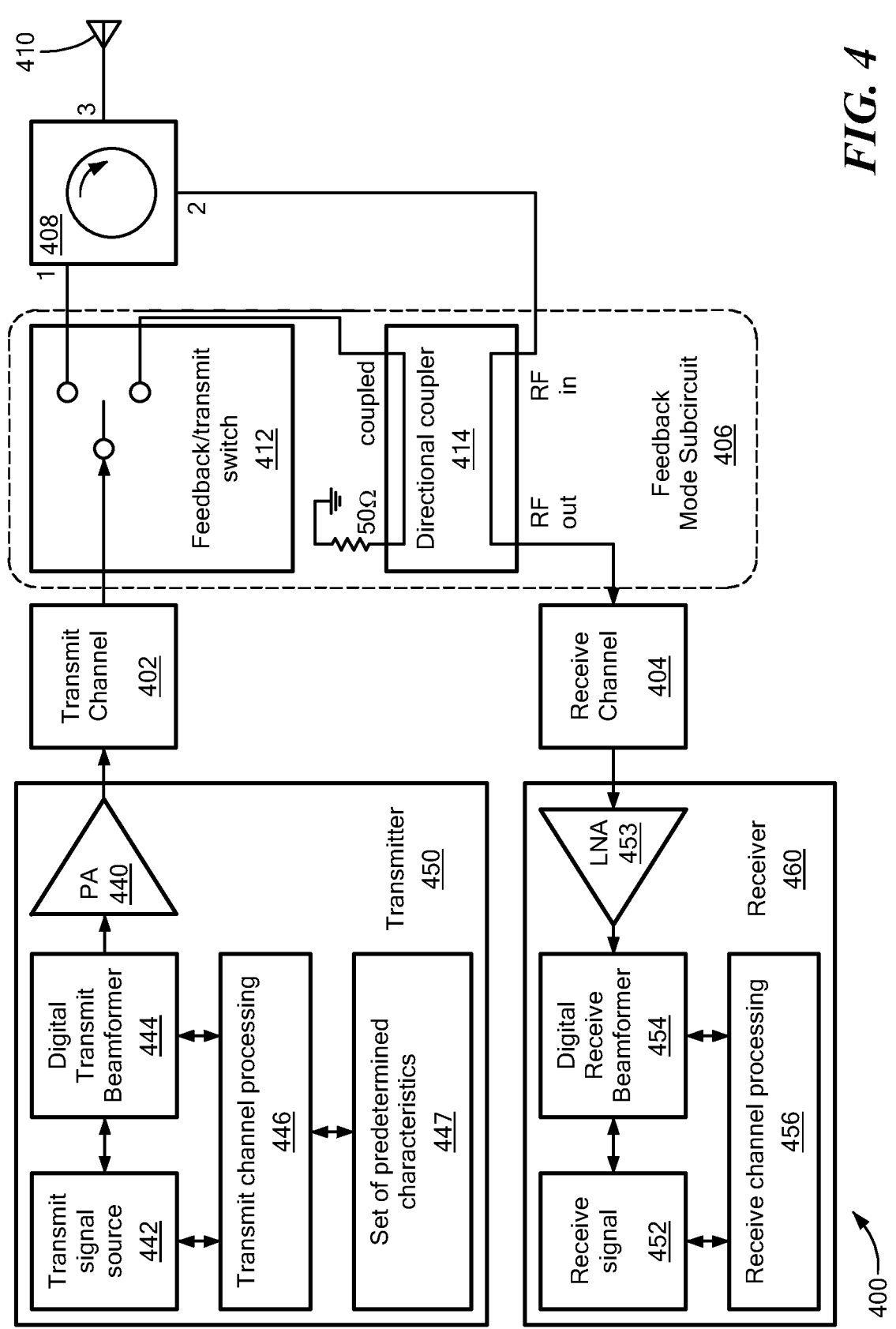
FIG. 4 is a simplified schematic diagram of a digital array architecture that incorporates the architectural addition to the T/R element of FIG. 2, in accordance with one embodiment.

FIG. 4 is a simplified schematic diagram 400 of a digital array architecture that incorporates the architectural addition to the T/R element of FIG. 2, in accordance with one embodiment. FIG. 4 also shows, in simplified form, additional circuitry for the transmit channel 402 and the receive channel 404, including back end hardware, where the back end hardware, such as transmitter 450 and receiver 460, in certain embodiments, are each also configured to provide signals to multiple transmit channels 402 in the array and to receive signals from multiple receive channels 404 in the array. In certain embodiments, the back end hardware is configured for determining and/or generating the active cancellation signal, as discussed further herein. The transmitter 450 includes a transmit channel processing block 446 that is in operable communication with a set of predetermined characteristics 447, which are related to knowledge of the array's coupling matrix and known characteristics of the array's channels (the set of predetermined characteristics are discussed further herein in connection with FIGS. 15, and 16). The set of predetermined characteristics are used to help generate the active cancellation signal, as discussed further herein.

The transmit channel processing block 446, in certain embodiments, includes a processor and/or a computer system, such as that shown in FIG. 17 (discussed further herein). The transmit channel processing block 446 configures a digital transmit beamformer 444. The digital transmit beamformer 444 processes the transmit signal(s) 442 provided thereto and provides each transmit channel 402 with the appropriate waveform for either transmission or feedback/coupling, depending on the transmit channel processing 446 for that transmit channel 402. In certain embodiments, the output of the digital transmit beamformer 444 is amplified, such as in a power amplifier (PA) 440, before being coupled to the transmit channel 402.

Similarly, the receive channel 404 provides its respective signal (which includes the signal of interest from the antenna 410 as well as, in certain embodiments, a coupled feedback signal from the directional coupler 414), to a low noise amplifier (LNA) 453, which then provides the signal to the digital receive beamformer 454. As is understood in the art, in certain embodiments, the digital receive beamformer 454 (as well as the digital transmit beamformer 444) can be implemented using a processor system (e.g., a digital signal processor (DSP) coupled to a memory (such as a ROM, EPROM, EEPROM, flash memory, HDD, or any combination thereof) or a computer system similar to that of FIG. 17, or coding in any type of a processor, such as via a properly programmed digital signal processor (DSP) circuit or an application specific integrated circuit (ASIC). Functionally equivalent circuits may also be used.

The digital receive beamformer 454 converts the received signal into a receive signal 452, e.g., in digital form. As noted previously, for T/R elements 107 that are in receive mode, the signal arriving at PA 450 will already have had the portions of the received signal that include mutual coupling, already cancelled out by the active cancellation that is accomplished by feeding back the specifically generated transmit waveform that was created based on the array's coupling matrix and array channel and feedback path characteristic information. Thus, the signal arriving at LNA 450, advantageously, will closely match the received signal from the target area.

The feedback mode subcircuit 406 of FIG. 4 shows the feedback/transmit switch 412 in a neutral position (not set either to transmit or receive, simply for purposes of example. As can be seen in FIG. 4, the feedback output of the feedback/transmit switch 412 is connected to the coupled port of directional coupler 414, and the input of directional coupler 414 is connected to port 2 of the circulator 408, so that signals captured by antenna 410 will be operably coupled to the RF input of directional coupler 414 and therein routed, via the RF output of the directional coupler 414, to the input of PA 450.

Figures 5, 6:
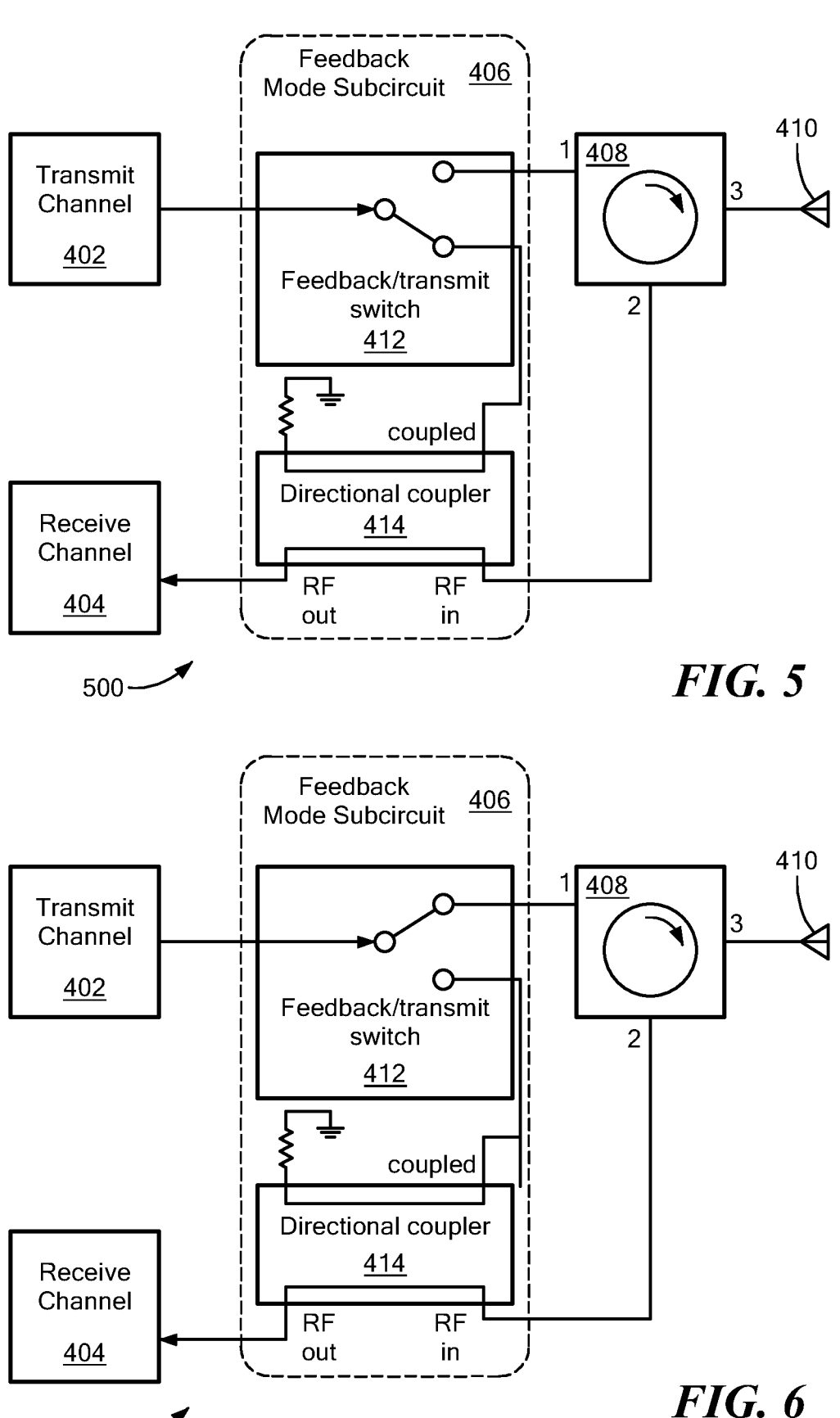
FIG. 5 is a simplified schematic diagram of the T/R element of the digital array architecture of FIG. 4, in feedback mode, in accordance with one embodiment.
FIG. 6 is a simplified schematic diagram of the T/R element of the digital array architecture of FIG. 4, in transmit mode, in accordance with one embodiment.

FIG. 5 is a simplified schematic diagram 500 of the T/R element of the digital array architecture of FIG. 4, in feedback mode, in accordance with one embodiment. In feedback mode, the feedback/transmit switch 412 is set to couple the transmitter channel 402 to the coupled input of the directional coupler 414, so that the full TX path 402's energy is directed into the directional coupler's coupled input 414.

FIG. 6 is a simplified schematic diagram of the T/R element of the digital array architecture of FIG. 4, in transmit mode, in accordance with one embodiment. In transmit mode, the feedback/transmit switch 312 is set to couple the transmitter channel 402 directly to port 1 of the circulator 408, so that the circulator 408 will couple the port 1 input to port 3 (i.e., the antenna radiator 410). It also should be noted that the circulator 408 is but one type of isolation element that can be used in between the feedback/transmit switch 312 and the antenna radiator 410, as will be appreciated by those of skill in the art, and the embodiments herein are not limited to use only with circulators, as will be understood.

Because it is known in advance whether a given TX/RX element 107 will be in feedback mode, the transmit signal that is transmitter 450 provides to a TX/RX element 107 in feedback mode is a signal that is configured (via the algorithm of FIGS. 15 and 16, discussed further below) to be a TX waveform that substantially matches what is predicted to be the received signal from mutual coupling, but is further configured to be at a 180 degree phase shift from the received signal from mutual coupling, such that when the two are added together, along with the actual received signal from the far field (that was captured by antenna 410), the received signal from mutual coupling is effectively cancelled out by the received signal from the TX feedback mode (via directional coupler 414), leaving only the receive signal from the far field (i.e., the desired signal) to be input to the receiver 460. This is advantageous, because it provides active cancellation as the signals are arriving, so no post processing in the receiver 460 is needed. Further, because this arrangement uses predetermined knowledge about array characteristics and coupling (as discussed further herein), the compensating signal from the transmitter channel 402 in feedback mode, can be applied to full effect immediately upon array transmission. In addition, in accordance with certain embodiments herein, implementing an algorithm utilizing knowledge of an array's coupling matrix and commanded waveforms, together with the proposed architecture, prevents self-compression of any of the analog receive chain, rather than simply applying digital corrections in post-processing as is done in many previous methods.

In certain embodiments, the feedback mode subcircuit 406 is added to the end of at least a portion of the TX/RX channels in an antenna array, such as an antenna array to be configured for STAR operation. In addition, in certain embodiments, during operation, the specific antenna element(s) that is/are in receive mode, or transmit mode, can be varied or constantly changed, while the calculation for determining the necessary active cancellation signals for correction of mutual coupling signals is constantly updated throughout the array without lag. The elements can be switched between TX mode or RX and Feedback mode at any time without lag or degradation of the algorithm or process as discussed further below. Because an antenna array is calibrated at the time of manufacture (and, in some instances, also at the time of any repair/test or in the field), it is possible to determine the coupling matrix, which contains the coupling information from every antenna element to every other antenna element. Thus, there are many ways that antenna elements can be configured during STAR operation to implement the active cancellation arrangement. For example, in some arrays, in certain embodiments, a subset of antenna elements are configured to be a subarray that is always in transmit mode and a certain subset are configured to be another subarray that is always in feedback mode. These subsets can be predetermined and fixed, in certain embodiments. These subsets also can vary at any given time, in certain embodiments. In certain embodiments, the specific subsets elements that are set in transmit mode or receive and feedback mode can be set dynamically, though in certain embodiments, there can be a set of antenna subset assignments, and the array as a whole can be configured to choose one of the predetermined sets to cycle through during operation.

Figure 7:
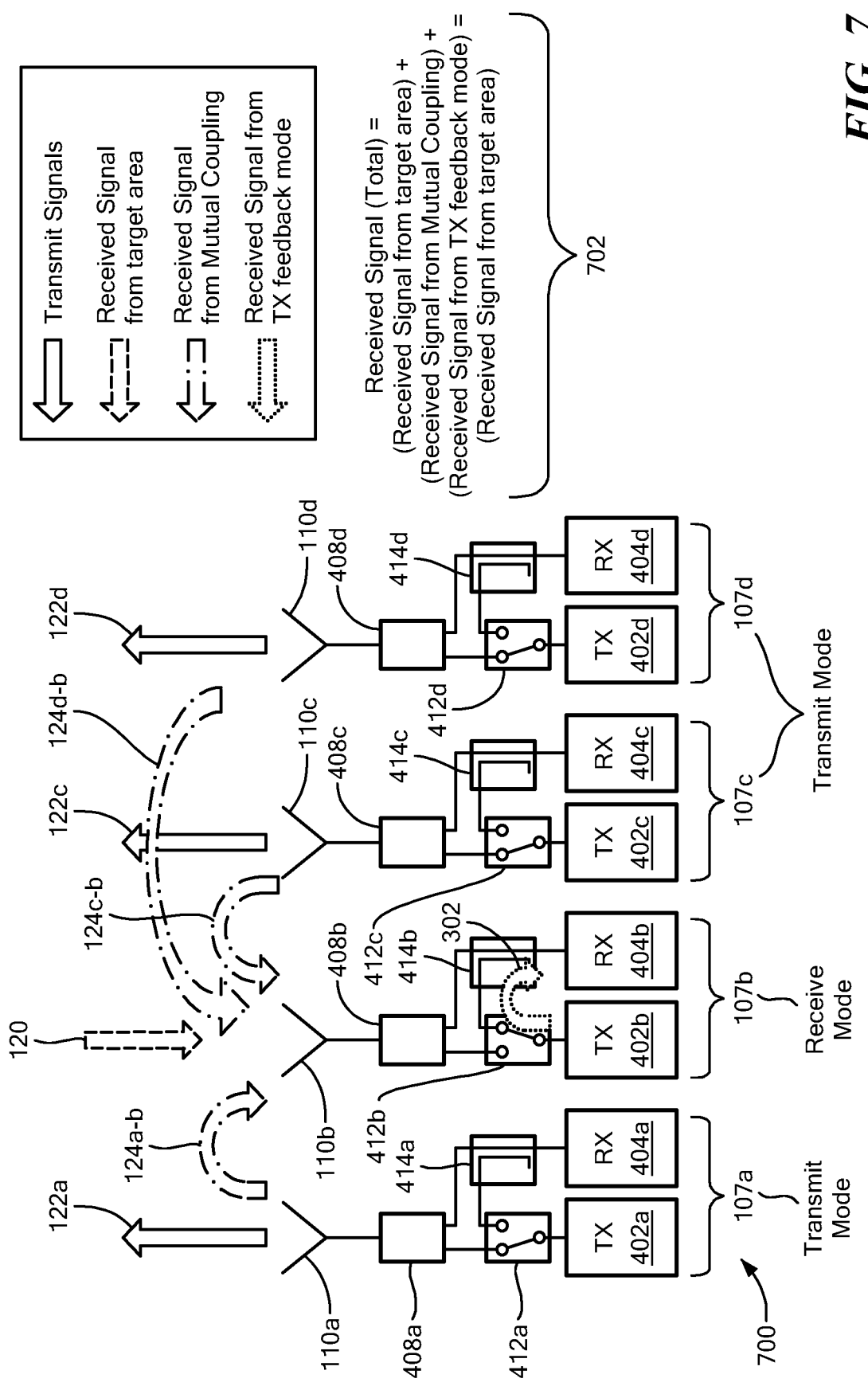
FIG. 7 is a simplified block diagram of the first modified digital array architecture of FIG. 2, showing an array level instantiation, in accordance with one embodiment.

FIG. 7 is a simplified block diagram 700 of the first modified digital array architecture of FIG. 2, showing an array level instantiation, in accordance with one embodiment. It will be appreciated that although FIG. 7 shows only four T/R elements 107, the arrangement of FIG. 7 can be expanded to arrays of any size. As FIG. 7 shows, the T/R elements 107*a*, 107*c*, and 107*d* are in transmit mode and are transmitting respective signals 122*a*, 122*c*, and 122*d*, to the far field. T/R element 107*b* is in receive mode and also has its feedback/transmit switch 412*b* set for feedback/coupling. T/R element 107*b* receives the received signal 120 from the far field, which is the desired signal. However, T/R element 107*b* also receives signals 124*a-b*, 124*c-b*, 124*d-b*, from mutual coupling between T/R element 107*b* and other adjacent elements (as well as other elements in the array). In accordance with the embodiments herein, the T/R element 107*b* also receives a TX feedback signal 302 from TX feedback mode.

The additional architecture (feedback mode subcircuit 406) and the use of the method and algorithm (discussed further herein in connection with FIGS. 15-16) cooperate to enable active cancellation of the mutual coupling. In particular, the calculated combined coupled TX signal at a given RX channel (e.g., the receive channel 404*b*), is recreated with 180 degree phase shift by the same element's TX channel in 402*b* as set in Feedback Mode. The calculated combined coupled TX signal at RX channel 404*b* is the total of the received signal from mutual coupling, which is the sum of 124*a-b* (mutual coupling from element 107*a* to element 107*b*) plus 124*c-b* (mutual coupling from element 107*c* to element 107*b*) plus 124*d-b* (mutual coupling from element 107*d* to 107*b*). The received signal from TX feedback mode is the TX feedback signal 302. In accordance with the equation 302 of FIG. 7, the coupled TX energy (i.e., the received signal from mutual coupling) is actively cancelled by the Feedback Mode signal 302, which is added to it in equation 702, before the received signal (all signals going into receive channel 404*b*) reaches the first RF amplifier in RX channel (i.e., the LNA 450 of FIG. 4). As a result, the array 700 of FIG. 7 as a whole can be transmitting while certain elements in the array, set to RX mode (e.g., element 107*b*), do not experience the coupled signal in their respective RX channels (e.g., receive channel 404*b*), maintaining traditional RX-only mode sensitivity and dynamic range, effectively enabling STAR for the array 700. Equation (1) below repeats the information in equation 702 of FIG. 7:

> Received Signal (Total)=(Received Signal from target area)+(Received Signal from Mutual Coupling)+(Received Signal from TX Feedback Mode)=(Received Signal from target area) (1)

Figure 14A:
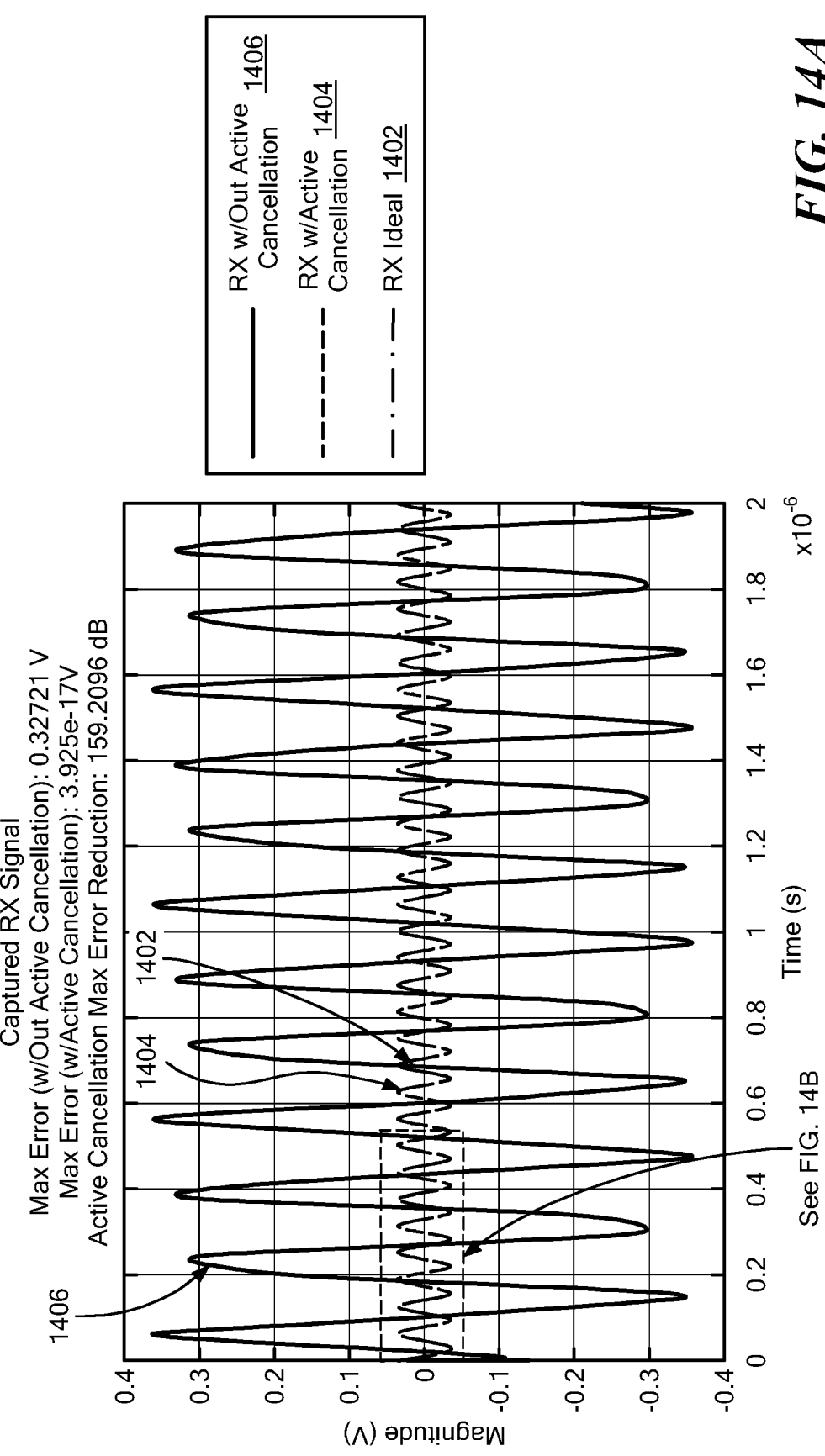
FIG. 14A is an exemplary graph of a captured RX signal with active cancellation, based on the simulation of the based on a simulation of a STAR at every antenna element array architecture, in accordance with one embodiment.
Figure 14B:
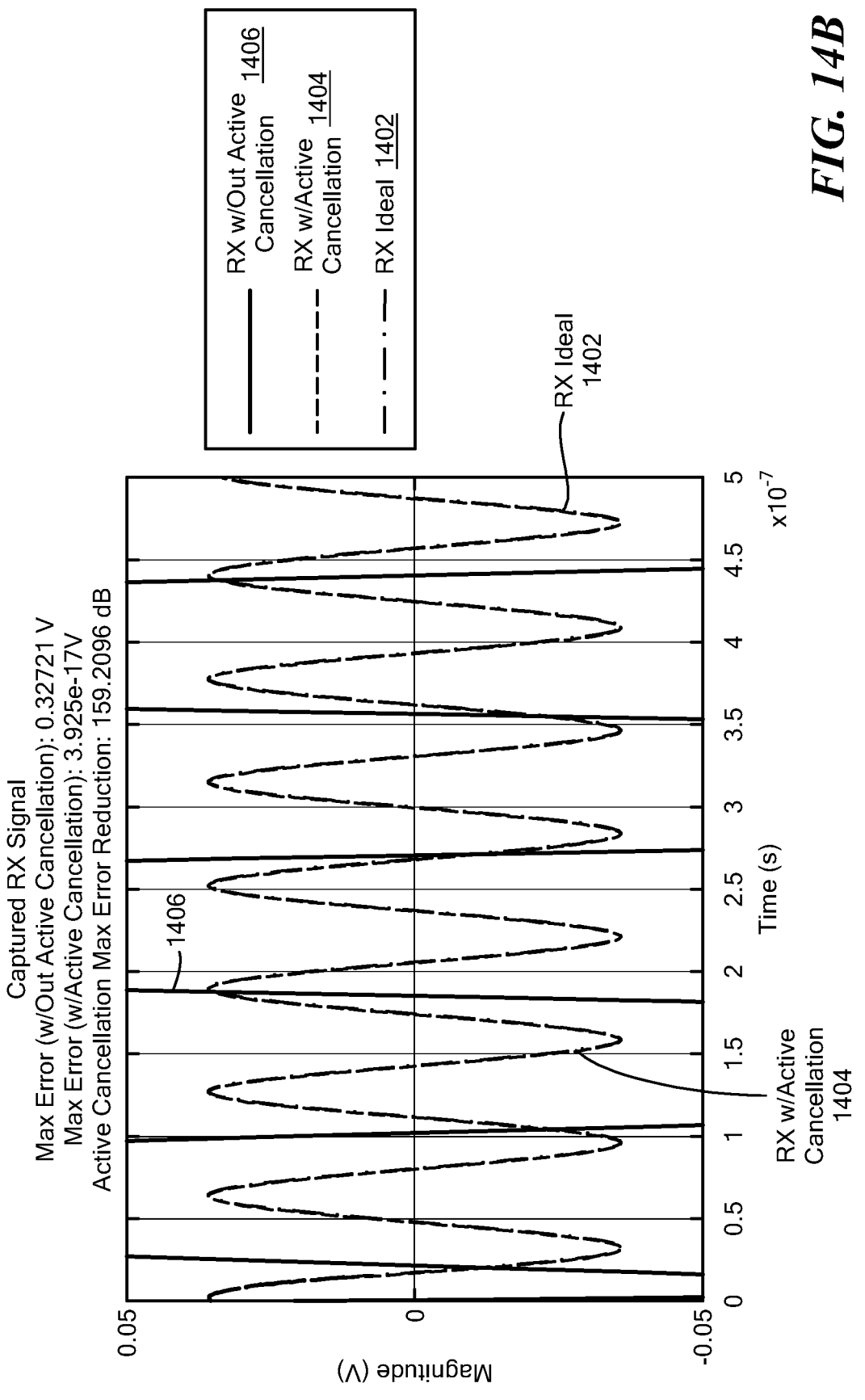
FIG. 14B is an enlarged view of a portion of the graph of FIG. 14A, showing that the RX with active cancellation matches the RX ideal, in accordance with one embodiment.
Figure 15:
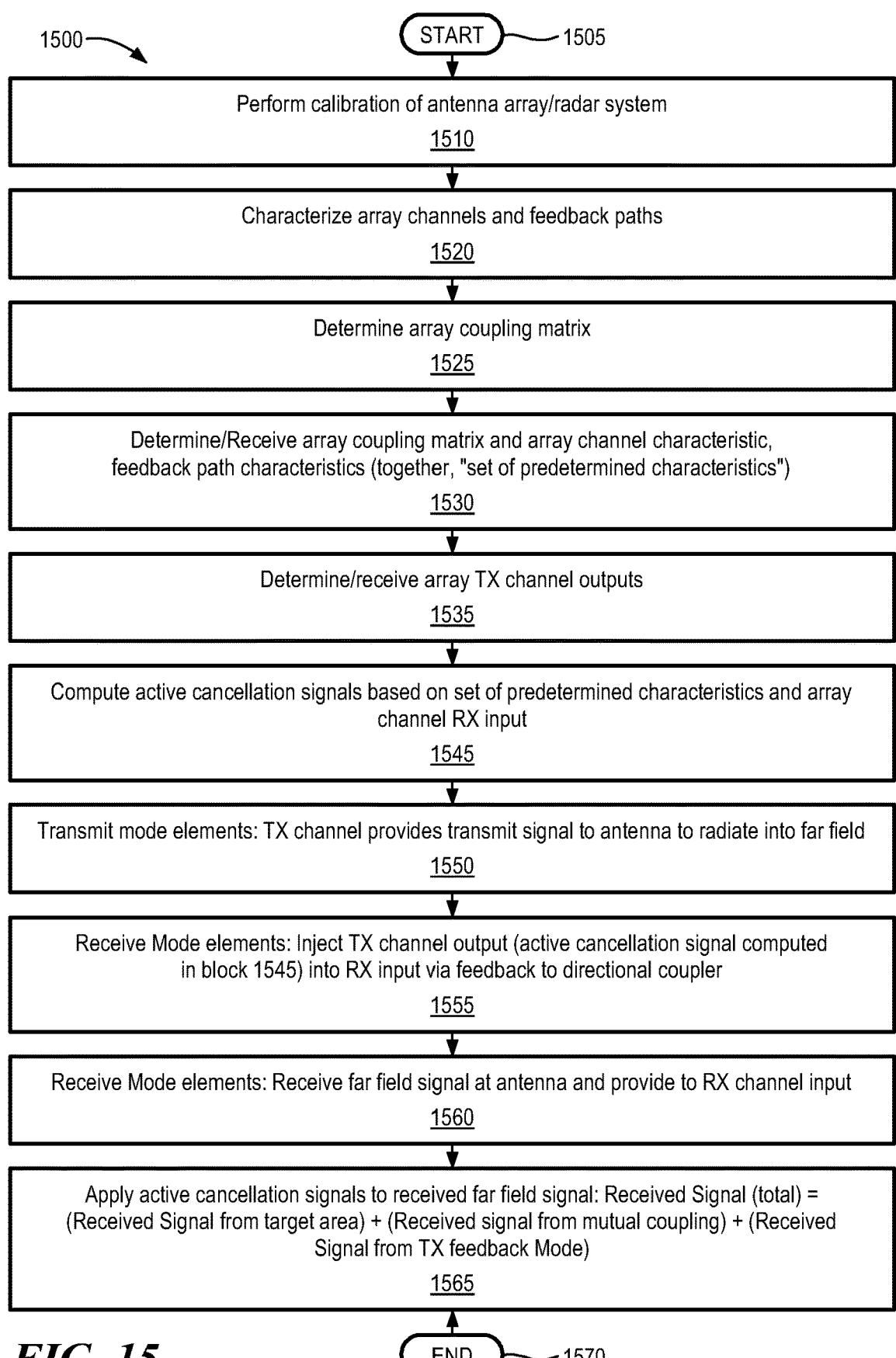
FIG. 15 is a flow chart of a process for active array cancellation, usable with the systems of FIGS. 1-9, in accordance with one embodiment.

Before describing another arrangement to use the same concept of a Feedback signal in FIGS. 8-14), the method and algorithm for creating the active cancellation signal is now described, and reference is now made to FIG. 15, which is a flow chart 1500 of a process for active array cancellation, usable with the systems of FIGS. 1-9, in accordance with one embodiment, and also to FIG. 16, which is an overview of an exemplary algorithm that is implemented as part of the flow chart of FIG. 15, in accordance with one embodiment.

Referring to FIGS. 15 and 16, the information necessary to perform the process/algorithm to determine the coupling matrix for an array and to characterize array channels and feedback paths, in certain embodiments, happens in connection with calibration of an antenna array (block 1510), because the algorithm and process, in certain embodiments, rely on an assumption that the array's coupling matrix is known and the array channels and feedback paths are characterized. The individual TX, RX, and Feedback paths are characterized (block 1520). During calibration, the coupling parameters would be measured, calculated, and saved to system memory during calibration as matrices (block 1525):

$$C_0 \; (i_{RX}, i_{TX}), \; C_1 \; (i_{RX}, i_{TX}), \; \ldots, \; C_K \; (i_{RX}, i_{TX}), \; \text{etc.} \; \ldots,$$

where:

The C subscript number is the delay (in clock cycles) of the coupling terms

K is the maximum delay (in clock cycles) necessary to fully characterize signal coupling in the array $i_{RX}$ is the RX element number $i_{TX}$ is the TX element number Multiple matrices for different clock cycle delays are necessary to support active cancellation during wideband array operation (e.g., as compared to narrow band array operation)

Figure 8:
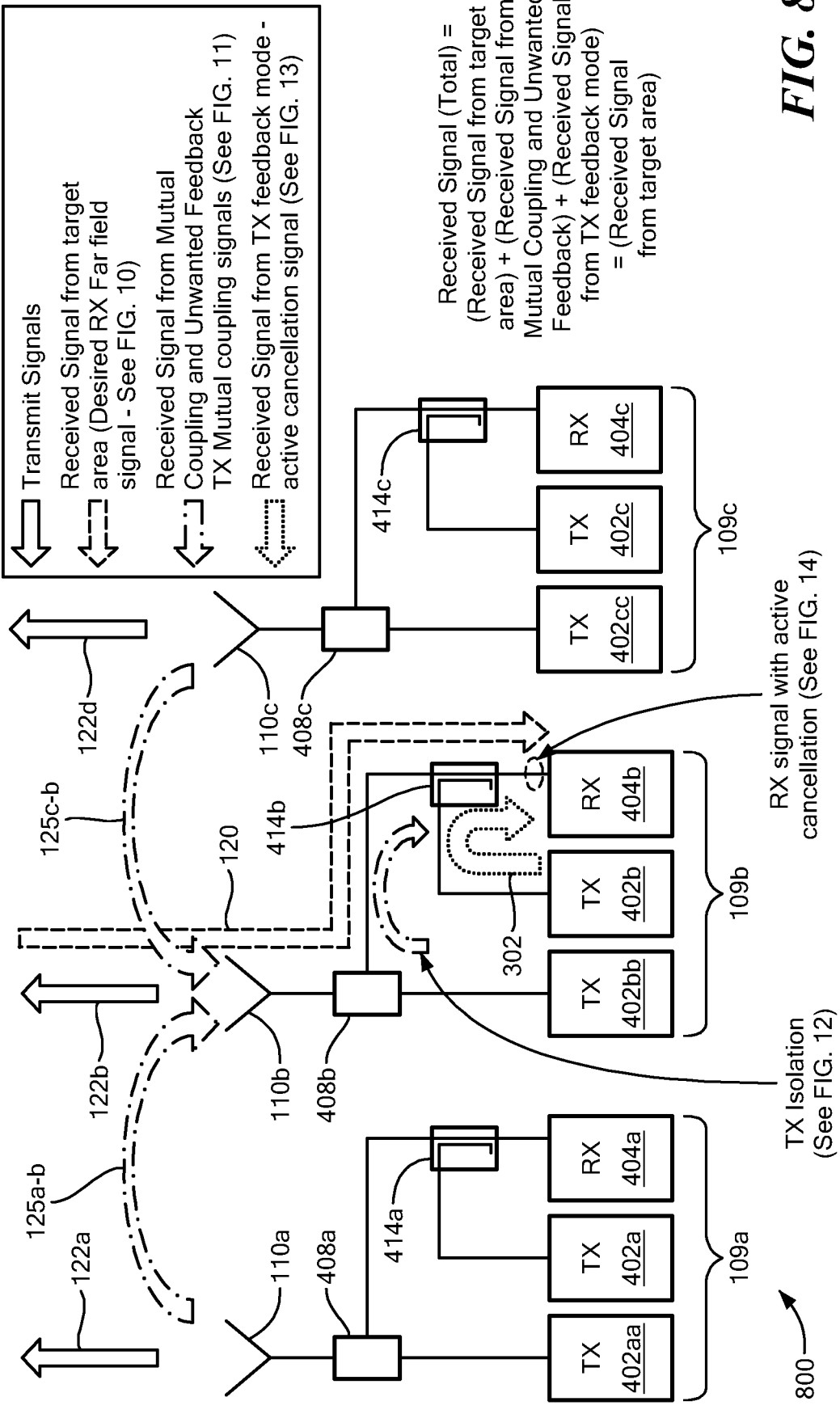
FIG. 8 is a simplified block diagram of a second modified digital array architecture, having a STAR at every antenna element and two independent TX channels, in accordance with one embodiment.

The non-diagonal terms are characterized coupling matrix values while the diagonal terms of the Matrix C diagonal are the input return loss coupling paths, particularly relevant for the modified architecture as seen in FIG. 8. Each matrix C is one of group of matrices, which are configured to take into account the time delay and travel time between any two coupled elements. As those of skill in the art will appreciate, the coupling term will be different for two elements directly adjacent to each other versus two elements at opposite corners of the array away from each other, at least because of the travel time of the coupled signals, between the elements, that it takes a signal (e.g., a mutually coupled signal) to go from one element to another element. Taking into account the time delay aspect, in the coupling matrices, enables the process to work with instantaneous wide band signals rather than just being restricted to narrow band signals. All array TX channel output signals S(i, n) are known due to knowledge of the array channels' characterizations and commanded excitations at each element i and time sample n (block 1520, 1535). Together, the array coupling matrix(es) $C_K(i_{RX}, t_{RX})$ and the array channel characteristics and feedback path characteristics, correspond to a "set of predetermined characteristics" (block 1530) that are used to help create the active cancellation signal 302. The array RX channel input signals that are expected can be computed (block 1545) based on the set of predetermined characteristics.

$$R_{CAP}(i, n) = R_{ideal}(i, n) + \sum\nolimits_{k=0}^{K} (C_k \cdot S(i, n-k))$$

All captured array RX channel input signals without active cancellation can be represented as:

$$R_{CAP}(i, n) = R_{ideal}(i, n) + \sum\nolimits_{k=0}^{K} (C_k \cdot S(i, n-k)) \quad (2)$$

$$R_{CAP}(i, n) = R_{ideal}(i, n) + \sum\nolimits_{k=0}^{K} (C_k \cdot S(i, n-k))$$

$$R_{CAP}(i, n) = R_{ideal}(i, n) + \sum\nolimits_{k=0}^{K} (C_k \cdot S(i, n-k))$$

where $R_{ideal}(i,n)$ is the desired far-field RX channel input signals, i is the element number, and n is the time sample.

$$R_{CAP}(i, n) = R_{ideal}(i, n) + \sum_{k=0}^{K}(C_k \cdot S(i, n-k))$$

$$A[i, n] = -\sum_{k=0}^{K}(C_k \cdot S(i, n-k))$$

Calculation of active cancellation signals A[i,n] is done as follows in equation (3):

$$A[i, n] = -\sum_{k=0}^{K}(C_k \cdot S(i, n-k)) \quad (3)$$

$$A[i, n] = -\sum_{k=0}^{K}(C_k \cdot S(i, n-k))$$

$$A[i, n] = -\sum_{k=0}^{K}(C_k \cdot S(i, n-k))$$

$$R_{Cap}(i, n) = R_{ideal}(i, n) + \sum_{k=0}^{K}(C_k \cdot S(i, n-k)) + A[i, n] = R_{ideal}(i, n)$$

The active cancellation signal A[i,n] (i.e., the active cancellation signal that a transmit channel 402 in feedback mode), injects back into the receiver channel 404 via the switch 412 being set to feedback mode and via the directional coupler 414, as noted above. Therefore, with active cancellation active, equation (4) shows that the captured RX channel 404 input signal $R_{Cap}(i, n)$ will end up being the same as the received signal from the target area, which is $R_{ideal}(i, n)$:

$$R_{Cap}(i, n) = R_{ideal}(i, n) + \sum_{k=0}^{K}(C_k \cdot S(i, n-k)) + A[i, n] = R_{ideal}(i, n) \quad (4)$$

$$R_{Cap}(i, n) = R_{ideal}(i, n) + \sum_{k=0}^{K}(C_k \cdot S(i, n-k)) + A[i, n] = R_{ideal}(i, n)$$

$$R_{Cap}(i, n) = R_{ideal}(i, n) + \sum_{k=0}^{K}(C_k \cdot S(i, n-k)) + A[i, n] = R_{ideal}(i, n)$$

Thus, the known array and excitation characteristics enable calculation and execution of array-level active cancellation.

Referring again to FIG. 15 (and also to exemplary diagrams of FIGS. 2 through 7), during STAR operation, for T/R elements 107 in transmit mode, the TX channel 402 provides a transmit signal to the antenna radiator 410 to radiate into the far field (block 1550). At the same time, for T/R elements 107 in receive mode (e.g., like element 107b in FIG. 3), the output of the TX channel 107 (which corresponds to the active cancellation signal computed in block 1545) is injected into the input of the RX channel 404 input via feedback to the directional coupler 414 (block 1555). At the same time, the T/R elements 107 in receive mode are configured to receive a far field signal at the antenna 410 and the signal is provided to the input of RX channel 404 via port 2 of circulator 408 (block 1560). Effectively, by combining at the input of the RX channel 404 (received far field signal), with the TX feedback into the directional coupler 414, active cancellation is applied to the received far field signal (block 1565). Thus, per equation (5):

Received Signal (total)=(Received Signal from target area)+(Received signal from mutual coupling)+

(Received Signal from TX feedback Mode)=
(Received Signal from target area)    (5)

In another embodiment, the method, algorithm, and other aspects of what is needed to create the TX feedback signal 302 are also usable with another radar array arrangement. FIG. 8 is a simplified block diagram of a second modified digital array architecture 800, with two independent TX channels (e.g., for element 109b, it would be first TX channel 402b and second TX channel 402bb). The array 800 of FIG. 8 modifies the architecture of the T/R element 107 (of FIGS. 2-7) to be a modified T/R element 109, where the transmit channel of element 109 is modified to be comprised of two independent TX channels 402, one dedicated to external transmission and one dedicated to Feedback Mode, in addition to the RX channel 404. For example, in the array 800, for element 109b, transmit channel 402bb is dedicated to external transmission and transmit channel 402b is dedicated to feedback mode.

Figure 9:
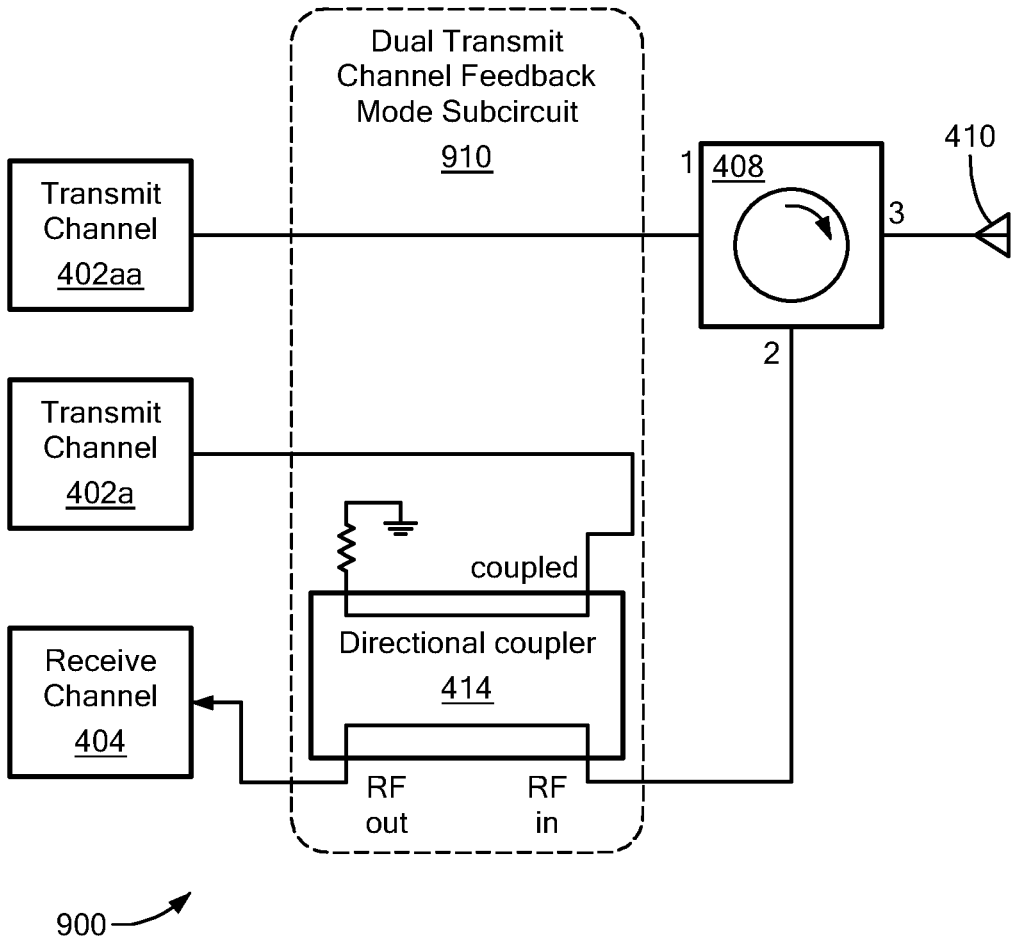
FIG. 9 is a simplified schematic diagram of a digital array architecture with a STAR at every antenna element, which incorporates the two independent TX channels of FIG. 8, in accordance with one embodiment.

Another diagram that illustrates what is done for the embodiment of FIG. 8, is shown in FIG. 9, which is a simplified schematic diagram 900 of a digital array architecture that incorporates the two independent TX channels of FIG. 8, in accordance with one embodiment. The simplified schematic diagram 900 of FIG. 9 is generally similar to that of FIG. 4, except that it has a modified dual transmit channel feedback mode subcircuit 910, where there is no feedback/transmit switch 412. Instead, one transmit channel 402aa is connected directly to port 1 of the isolation element 408 (e.g., circulator 408), so that it is coupled directly to antenna radiator 410 for transmission. Port 2 of the isolation element 408 is operably coupled to the RF in port of directional coupler 414, with the RF out port of directional coupler 414 operably coupled to the receiver channel 404. The other transmit channel 402a (which is providing the active cancellation signal) is "always" in feedback mode and is directly coupled into the coupled port of the directional coupler 414.

In certain embodiments, the only alteration to the array-level instantiation algorithm (e.g., equation 802 of FIG. 8), and the aforementioned algorithm described in connection with FIGS. 15 and 16, is the inclusion of the element's own TX to RX coupling signal when calculating the total coupled signal to negate through the TX Feedback Mode path. This can be seen, for example, with modified T/R element 109b of FIG. 8. The transmit channel 402bb provides a transmitted signal 122b, and the other transmit channel 402b provides a feedback signal, which is an active cancellation signal 302 similar to that of FIG. 7. Since, within the same T/R element 109b, there is one transmit channel 402bb that is always transmitting and one transmit channel 402b that is always providing the active cancellation signal 302, no switch 412 is needed (as with the embodiment of FIG. 7), because the T/R elements 109 of FIG. 8, are not designated to be in transmit mode or receive mode, as with the embodiment of FIG. 7. Rather, the embodiment of FIG. 8 enables STAR to happen at every channel of the array, individually (in contrast to the embodiment of FIG. 7, where the overall array operates with STAR but it is accomplished through the actions of there being some T/R elements 107, at a given time, being in receive mode and some being in transmit mode. As can be seen with the embodiment of FIG. 8, the process and algorithm described herein also can be fully implemented on a single antenna element as well as within an array setting. The above-described algorithm also is usable with the arrangement of FIG. 8, but, as one of skill in the art will appreciate, it can be expected that the diagonal of the coupling matrices would not universally be zeros due to the input return loss from transmit channel 402bb that is unintentionally coupled or routed back into receiver 404b. With the arrangement of FIG. 8, equation (6) shows how STAR functionality at element level is achieved:

Received Signal (Total)=(Received Signal from tar-
get area)+(Received Signal from Mutual Cou-
pling and Unwanted Feedback)+(Received Sig-
nal from TX Feedback Mode)=(Received Signal
from target area)        (6)

To help verify operation of the embodiments described herein, a simulation of an array having STAR at every antenna element, similar to the embodiment of FIG. 8, was completed by implementing the process in MATLAB and testing it as an example array with randomized parameters. Effectively, the simulation analyzes a single antenna element's receive signal while actively transmitting in the presence of other actively transmitting antenna elements. The RX Ideal signal (see FIG. 16 and also equations (2) and (4) above) was set to a different frequency than that of the TX signal, to simplify being able to see the results in the simulation graphs. The simulation included randomly generated independent beamsteering phase progressions for RX and TX signals. Because there was not a factory calibration of an actual array, simulated coupling matrices were developed. In particular, the coupling matrix (non-delayed and delayed) was formed using randomly generated complex values. In the simplified array example, N=4 (#elements), and K=5 (#clock cycle delays). As discussed further below, the simulation results verify predicted STAR capability through active cancellation of unwanted TX isolation and TX mutual coupling signals.

Figure 10:
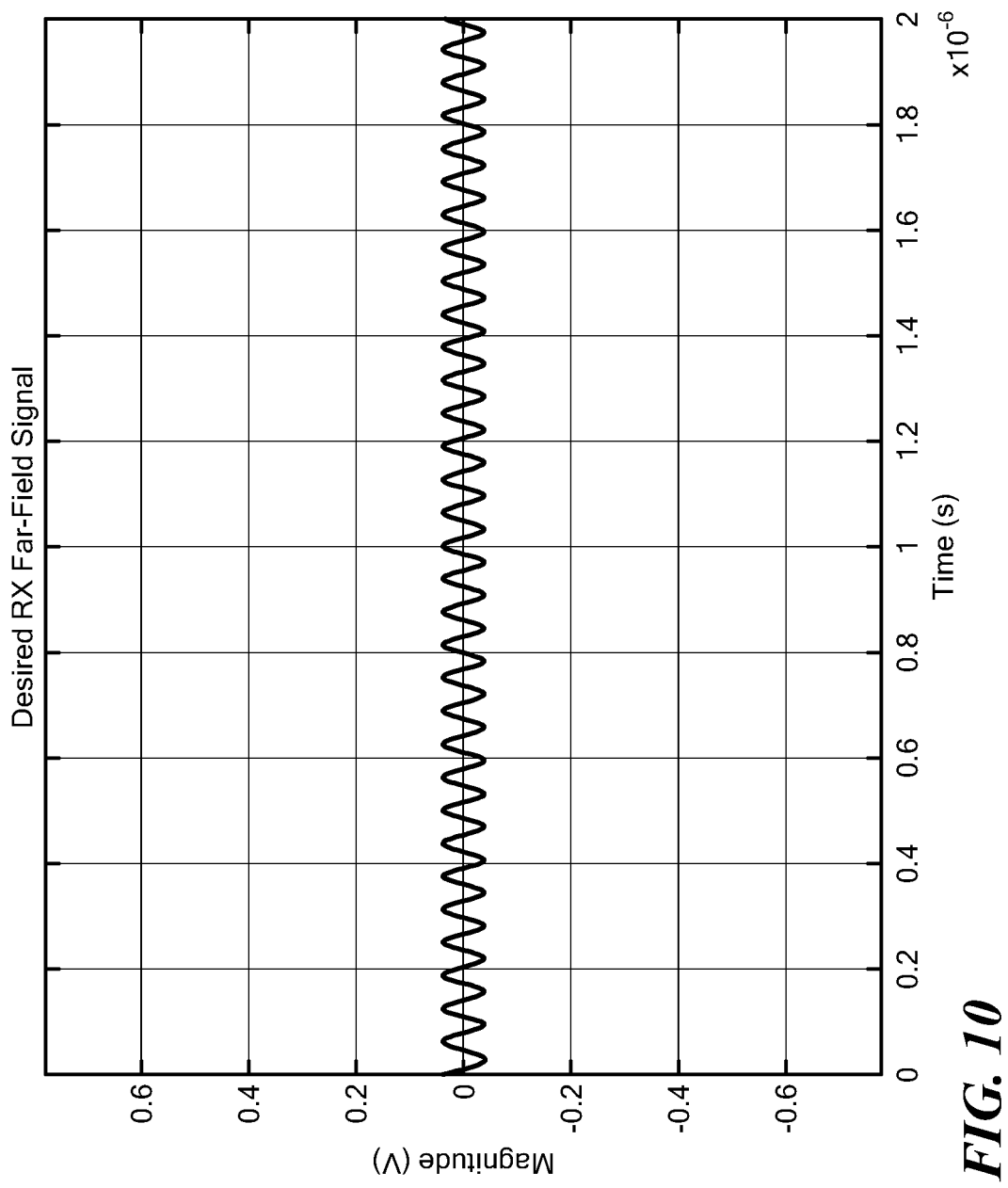
FIG. 10 is an exemplary graph of a desired RX far field signal, based on a simulation of a STAR at every antenna element array architecture, in accordance with one embodiment.

Referring again to FIG. 8, the received signal from the target area 120, which is the desired RX far field signal, can be seen in FIG. 10, which is an exemplary graph of a desired RX far field signal, based on a simulation of a STAR at every antenna element array architecture (not unlike the second modified digital array architecture of FIG. 8, but with four elements instead of three elements) in accordance with one embodiment. The simulations demonstrated in FIG. 10 through FIG. 14 do not incorporate additional noise, deterministic, or intentional errors. Accordingly, the graph of FIG. 10 is simply showing a small sine wave as an exemplary desired RX far field signal. In the simulation, to better differentiate between the signal that is desired to see out of the far field, vs what is being transmitted out, the signal that is a desired RX far-field signal is set to a different, higher frequency, than the signal being transmitted out, but those of skill in the art will appreciate that in an actual system, the signal being transmitted and the signal being received may occupy the same spectral band.

Figure 11:
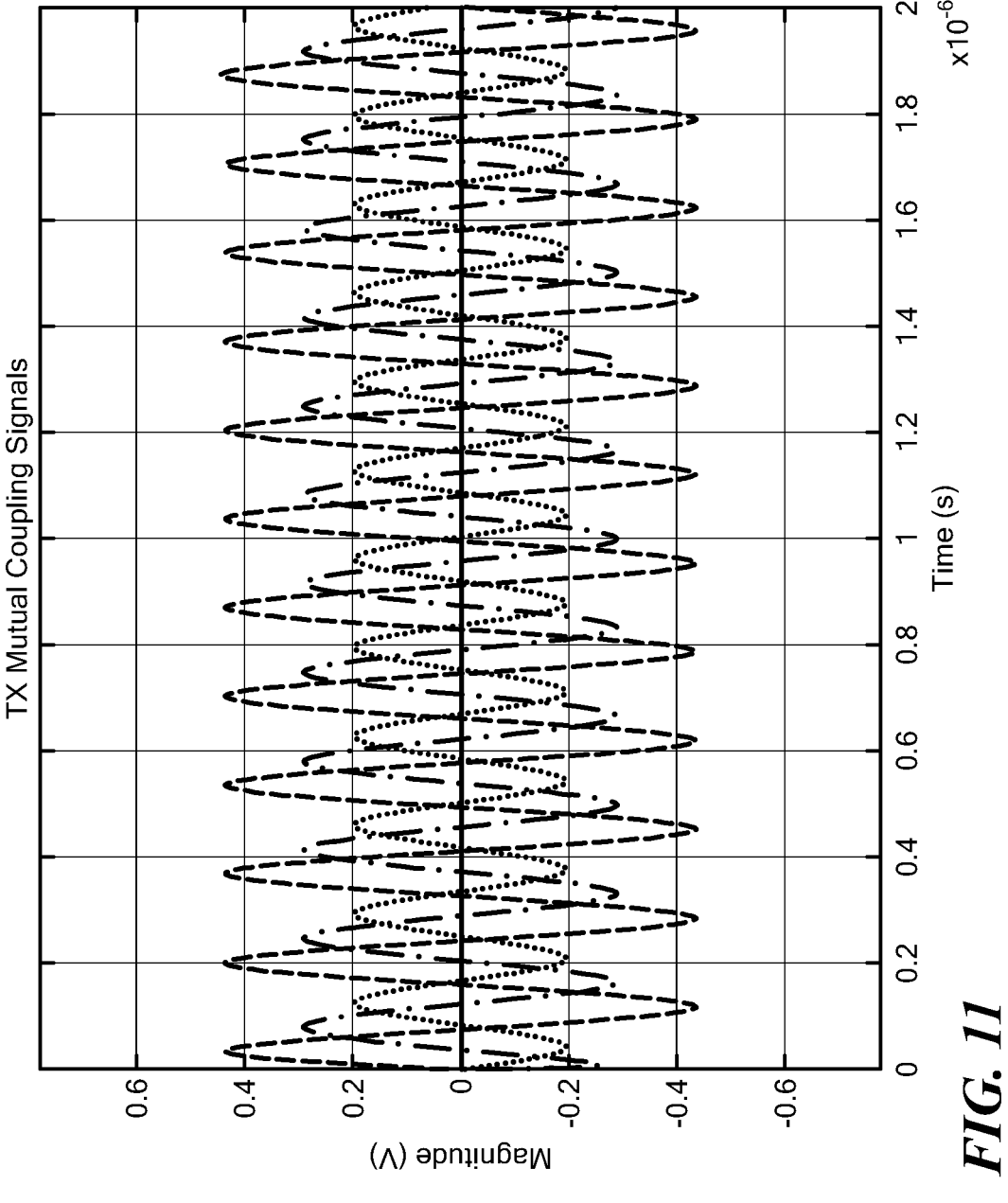
FIG. 11 is an exemplary graph of TX mutual coupling signals, based on the simulation of the based on a simulation of a STAR at every antenna element array architecture, in accordance with one embodiment.

FIG. 11 is an exemplary graph of the TX mutual coupling signals that one element in a four element array experiences, based on the simulation of a STAR at every antenna element array architecture, in accordance with one embodiment. FIG. 11 shows three different sine waves, corresponding to the three different external coupling signals to which a single RX element in the array would be subject. These coupling signals are, of course, merely exemplary and provided for the purposes of the simulation.

Figure 12:
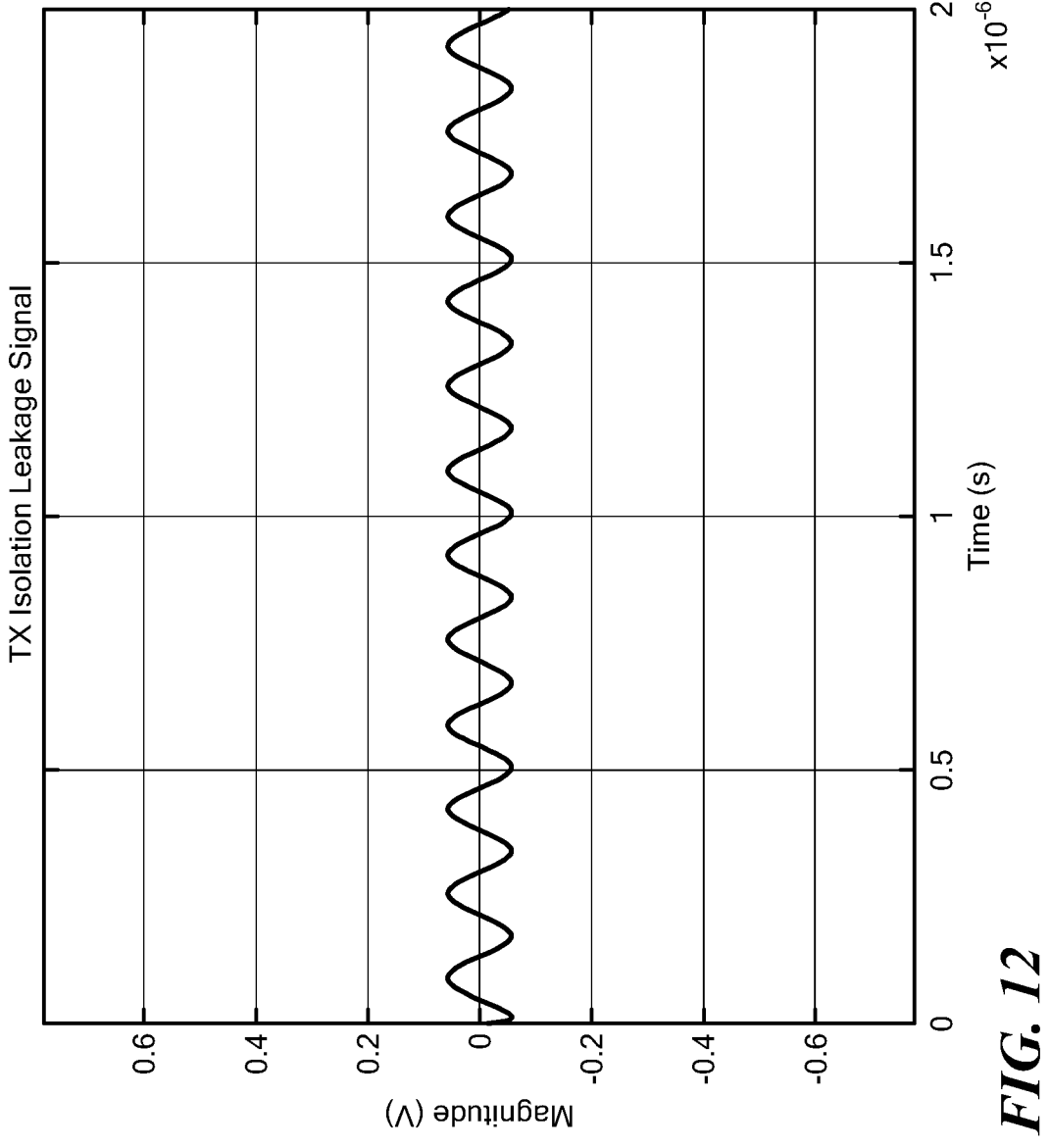
FIG. 12 is an exemplary graph of a TX isolation leakage signal, based on the simulation of the based on a simulation of a STAR at every antenna element array architecture, in accordance with one embodiment.

FIG. 12 is an exemplary graph of a TX isolation leakage signal, based on the simulation of the STAR at every antenna element array architecture, in accordance with one embodiment. The TX isolation leakage signal location is shown, for example, in FIG. 8, and corresponds to the leakage within the element of interest, which takes place from the transmit channel that is transmitting (for example, in the embodiment of FIG. 8, the leakage into receive channel 404b would be from the transmit channel 402bb that is transmitting).

Figure 13:
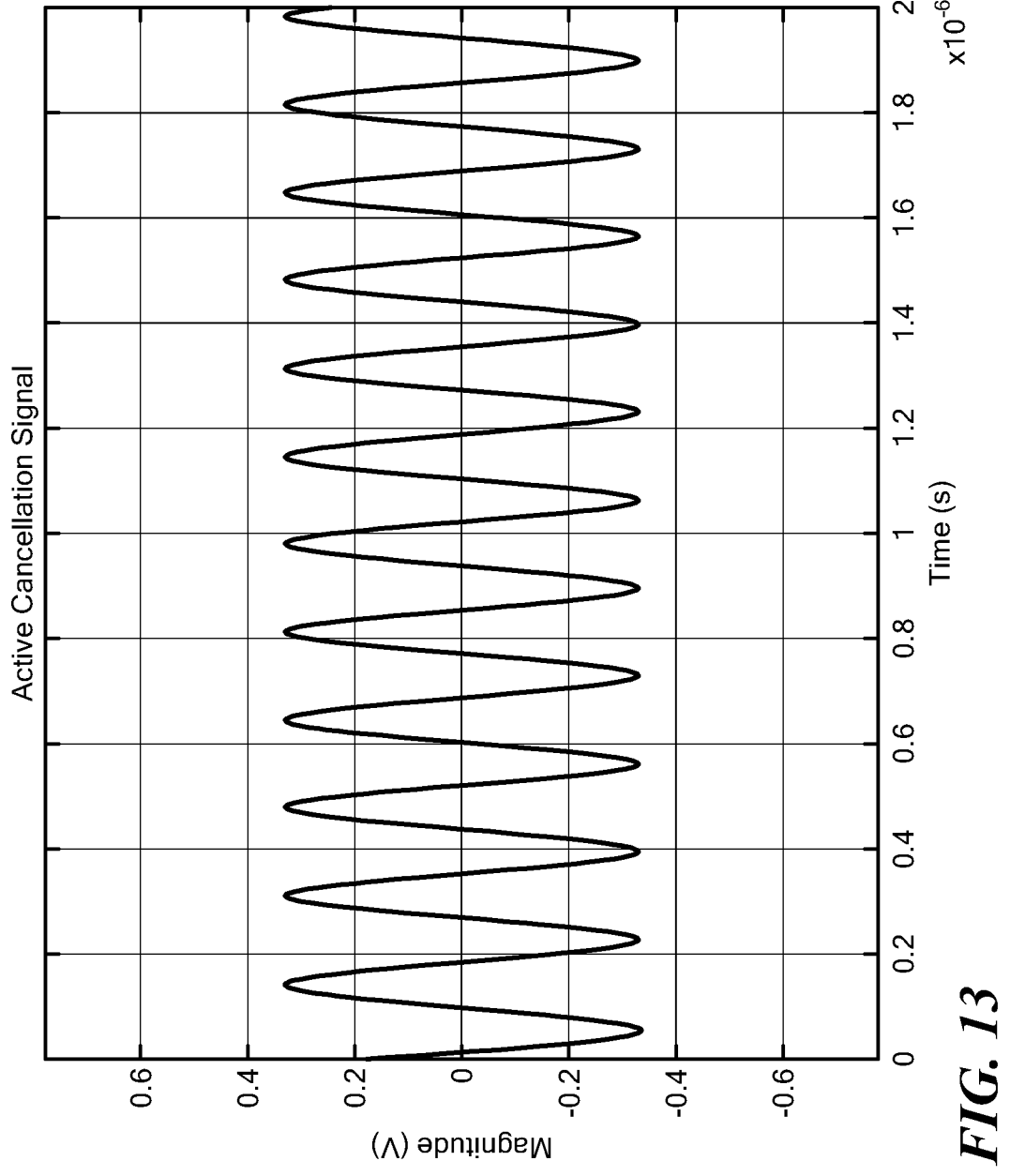
FIG. 13 is an exemplary graph of an active cancellation signal, based on the simulation of the based on a simulation of a STAR at every antenna element array architecture, in accordance with one embodiment.

FIG. 13 is an exemplary graph of an active cancellation signal, based on the simulation of the STAR at every element array architecture, in accordance with one embodiment. The active cancellation signal of FIG. 13 is generated in accordance with the process and algorithm of FIGS. 15 and 16, described herein. The active cancellation signal of FIG. 13 is what is combined with the total received signal, which is comprised of the desired RX far-field signal of FIG. 10, the TX mutual coupling signals of FIG. 11, and the TX isolation leakage signal of FIG. 12, to result in a signal equal to the desired far field signal of FIG. 10.

FIG. 14A is an exemplary graph of captured RX signals both with and without active cancellation, based on the simulation of the STAR at every antenna element array architecture, in accordance with one embodiment. FIG. 14A shows a first patterned line 1402 of dots and dashes indicating what the RX ideal waveform should be (this matches what was shown in FIG. 10). The solid line 1406 shows the RX without active cancellation applied, and it can be seen that the signal magnitude of the RX without active cancellation applied, at certain points, is much greater than the magnitude of the ideal RX signal (which would be the captured RX signal). It thus can be seen that, without active cancellation, the ideal RX signal would be masked by unwanted coupled signals.

In contrast, it can be seen in FIG. 14A, but also especially in FIG. 14B, that the RX signal with active cancellation 1404 (shown by a second dashed pattern line of just dashes) is a close match to the RX ideal signal 1402. FIG. 14B is an enlarged view of a portion of the graph of FIG. 14A, to better show how the RX with active cancellation signal 1404 closely matches the RX ideal signal 1402, in accordance with one embodiment. As FIG. 14A shows, the maximum error without active cancellation is dramatically higher than the maximum error with active cancellation. Thus, the simulation results of FIGS. 10-14B help verify that the RX channel with active cancellation equals the desired far-field RX signal.

This disclosure provides various embodiments that include an architecture and method for enabling STAR operation as a single element or as part of a digital aperture array by utilizing only a minor alteration to standard transceiver architecture. As explained above, implementing an algorithm utilizing knowledge of an array's coupling matrix and commanded waveforms with the proposed architecture prevents self-compression of any of the analog receive chain, in contrast to digital corrections in post-processing, which is described in some previous methods. With the addition of an iterative error reduction algorithm, one or more of the embodiments described herein also could enable rapid self-calibration of Digital Predistortion (DPD) and Non-Linear Equalization (NLEQ) while a system is deployed. With the addition of an Artificial Intelligence or Machine Learning algorithm to characterize non-cooperative jamming sources, one or more of the embodiments described herein also could also be utilized to actively cancel non-cooperative jamming sources as well. However, unlike techniques such as notching, one or more embodiments described herein allow the system to simultaneously transmit and receive in the direction of the jammer. In addition, it should be understood that, in certain embodiments, the proposed arrangements (including the proposed architecture and/or the proposed methods) are configured so that, for a given T/R element, the T/R element is able to actively cancel its own unwanted leakage signals, not just the coupled signals of other T/R elements. Thus, in some embodiments, it is not necessary for another T/R element to be the source of the unwanted signals; the arrangements herein have applicability and advantages even if applied to just a single element, whether operating alone or in an array.

It is also envisioned that any or all of the embodiments described herein and/or illustrated in FIGS. 1-16 herein could be combined with and/or adapted to work with the technologies described in one or more of the following commonly assigned U.S. patent applications and patents, including but not limited to:

U.S. Pat. No. 10,714,828 ("Microwave analog cancellation for in-aperture simultaneous transmit and receive");

U.S. Pat. No. 10,693,564 ("Photonics Interference Canceler");

U.S. Pat. No. 10,393,859 ("System and method for adaptive simultaneous transmit and receive leakage cancellation");

U.S. Pat. No. 10,200,075 ("Discrete time analog signal processing for simultaneous transmit and receive");

U.S. Pat. No. 9,553,712 ("Feed-forward canceller");

U.S. Pat. No. 9,479,214 ("Wideband active radio frequency interference cancellation system");

U.S. Pat. No. 8,041,363 ("Spectrum-adaptive networking");

U.S. Pat. No. 7,202,812 ("Technique for compensation of transmit leakage in radar receiver");

U.S. Patent Publication No. 2021/0013914 ("System and method for cancelling strong signals from combined weak and strong signals in communications system").

The above-listed, aforementioned commonly assigned patents and patent publications are hereby incorporated by reference. It should be understood, however, that the disclosed embodiments are not limited to use with the above-listed exemplary systems. The embodiments described herein have numerous applications and are not limited to the exemplary applications described herein. It should be appreciated that such references and examples are made in an effort to promote clarity in the description of the concepts disclosed herein. Such references are not intended as, and should not be construed as, limiting the use or application of the concepts, systems, arrangements, and techniques described herein to use solely with these or any other systems.

As will be understood, the computation of the active cancellation signals herein, along with other computations and controls described explicitly and implicitly herein, in certain embodiments, may be accomplished using one or more processors and/or computer systems. FIG. 17 is a block diagram of an exemplary computer system 1700 usable with at least some of the systems, apparatuses, and methods of FIGS. 2-15, in accordance with one embodiment. For example, in some embodiments, the computer system 1700 of FIG. 17 can be usable to accomplish some or all of the processing associated with the transmit channel processing block 446 or the receive channel processing block 456 of FIG. 4, as will be appreciated. The computer system 1700 also can be used to implement all or part of any of the methods, equations, and/or calculations described herein.

As shown in FIG. 17, computer 1700 may include processor/CPU 1702, volatile memory 1704 (e.g., RAM), non-volatile memory 1706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1710 (e.g., a touchscreen, a display, and so forth) and input and/or output (I/O) device 1708 (e.g., a mouse, a keyboard, etc.). Non-volatile memory 1704 stores, e.g., journal data 1704a, metadata 1704b, and pre-allocated memory regions 1704c. The non-volatile memory, 1706 can include, in some embodiments, an operating system 1714, and computer instructions 1712, and data 1716. In certain embodiments, the computer instructions 1712 are configured to provide several subsystems, including a routing subsystem 1712A, a control subsystem 1712b, a data subsystem 1712c, and a write cache 1712d. In certain embodiments, the computer instructions 1712 are executed by the processor/CPU 1702 out of volatile memory 1704 to implement and/or perform at least a portion of the systems and processes shown in FIGS. 1-15. Program code also may be applied to data entered using an input device or GUI 1710 or received from I/O device 1708.

The systems, architectures, and processes of FIGS. 1-17 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 17. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 1702, or any processor used to implement the embodiments included herein, may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit or system elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods.

Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a micro-controller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 17, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 17 shows Program Logic 1724 embodied on a computer-readable medium 1720 as shown, and wherein the Logic is encoded in computer-executable code configured for carrying out the reservation service process of this invention and thereby forming a Computer Program Product 1722. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrange-ments, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

In this disclosure, the terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" and "module" may include either a single component or a plurality of components, which are either active and/or passive and are connected or otherwise coupled together to provide the described function. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately pro-grammed processors, depending upon the signal frequencies or data rates to be processed and/or the functions being accomplished.

Similarly, in addition, in the Figures of this application, the total number of elements or components shown is not intended to be limiting; those skilled in the art can recognize that the number of a particular component or type of element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Further-more, in the illustrations, Figures, and text, specific names may be given to specific features, elements, circuits, mod-ules, tables, software modules, systems, etc. Such terminol-ogy used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodi-ments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A simultaneous transmit and receive (STAR) system, comprising:
a plurality of radiating elements configured as part of an antenna array, the antenna array configured for transmitting signals and for receiving signals; and
a plurality of antenna transmit/receive (T/R) elements, each respective T/R element being in operable communication with a respective radiating element, each respective T/R element comprising a transmit channel, a receive channel, a switch, and a directional coupler, wherein, for each respective T/R element:
the directional coupler comprises a radiofrequency (RF) input in operable communication with the antenna array to receive a signal received by the antenna array, an RF output configured to couple the received signal to an input of the receive channel, and a coupled input in operable communication with the switch; and
when the switch is set to a first predetermined state, the transmit channel is configured to couple an active cancellation signal to the coupled input of the directional coupler, the active cancellation signal configured to cancel at least some coupling effects that arise on an input to the receive channel, the coupling effects arising from operation of at least a portion of the plurality of T/R elements.

2. The STAR system of claim 1, wherein, for each respective T/R element, the active cancellation signal is configured to enable the input to the receive channel to be as close a match as possible to the signal received by the antenna array.

3. The STAR system of claim 1, wherein:
a transmit channel input of at least a first T/R element of the plurality of T/R elements is configured to receive the respective active cancellation signal at substantially a same time that at least a second T/R element of the plurality of T/R elements is configured to receive a transmit signal to be provided to the respective radiating element of the second T/R element; and
the respective active cancellation signal at the first T/R element is configured to cancel at least one coupling effect that appears at the first T/R element and that is caused by the second T/R element.

4. The STAR system of claim 1, wherein:
the antenna array further comprises transmit and receive channels; and
the active cancellation signal for each respective T/R element is based at least in part on a coupling matrix for the antenna array and on at least one characterization of at least one of the transmit channels and the receive channels of the antenna array.

5. The STAR system of claim 1, wherein:
the active cancellation signal for each respective T/R element is based at least in part on one or more parameters out of a set of parameters measured and determined during a calibration of the antenna array; and
the set of parameters comprises a maximum delay necessary to fully characterize signal coupling in the antenna array, a receive element number, a transmit element number, one or more characterized feedback paths, one or more characterized coupling matrix values, knowledge of an antenna array channel's characterization, knowledge of a commanded excitation for each antenna element at a given time sample, and one or more antenna array channel transmit output signals.

6. The STAR system of claim 1, wherein, for each respective T/R element, the first predetermined state comprises a feedback state configured to couple an output of the transmit channel to the coupled input of the directional coupler.

7. The STAR system of claim 1, wherein, for each respective T/R element, when the switch is set to a second predetermined state, an output of the transmit channel is coupled to the respective radiating element.

8. The STAR system of claim 1, wherein:
a first subset of T/R elements are configured to have their respective switches set to the first predetermined state; and
the first predetermined state comprises, for each of the first subset of T/R elements, a feedback state configured to couple an output of the transmit channel to the coupled input of the directional coupler.

9. The STAR system of claim 8, wherein a second subset of T/R elements are configured to have their respective switches set to a second predetermined state in which, for each of the second subset of T/R elements, an output of the transmit channel is coupled to the respective radiating element.

10. The STAR system of claim 1, wherein, for each respective T/R element:
the switch comprises an input in operable communication with an output of the transmit channel, a transmit pole in operable communication with the respective radiating element, and a feedback pole in operable communication with the coupled input of the directional coupler;
wherein the switch is set to the transmit pole, the output of the transmit channel is provided to the respective radiating element; and
wherein the switch is set to the feedback pole, the output of the transmit channel is provided to the coupled input of the directional coupler.

11. A simultaneous transmit and receive (STAR) system, comprising:
a plurality of radiating elements configured as part of an antenna array, the antenna array configured for transmitting signals and for receiving signals; and
a plurality of antenna transmit/receive (T/R) elements, each respective T/R element being in operable communication with a respective radiating element, each respective T/R element comprising a first transmit channel, a second transmit channel independent of the first transmit channel, a receive channel, and a directional coupler, wherein, for each respective T/R element:
the first transmit channel has an input configured to receive a signal to be transmitted and an output configured to operably couple the signal to be transmitted to the respective radiating element;

the second transmit channel has an input configured to receive an active cancellation signal and an output configured to operably couple the active cancellation signal to the directional coupler;

the directional coupler comprises a radiofrequency (RF) input in operable communication with the antenna array to receive a signal received by the antenna array, an RF output configured to couple the received signal to an input of the receive channel, and a coupled input in operable communication with the output of the second transmit channel; and the active cancellation signal is configured to cancel at least some coupling effects that arise on an input to the receive channel, the coupling effects arising from operation of at least a portion of the plurality of T/R elements.

12. The STAR system of claim 11, wherein, for each respective T/R element, the active cancellation signal is configured to enable the input to the receive channel to be as close a match as possible to the signal received by the antenna array.

13. The STAR system of claim 11, wherein, for each respective T/R element, the input of the second transmit channel is configured to receive the active cancellation signal at substantially a same time that the first transmit channel is configured to receive the signal to be transmitted.

14. The STAR system of claim 11, wherein:

the input of the second transmit channel of a first T/R element of the plurality of T/R elements is configured to receive the active cancellation signal at substantially a same time that the input of the first transmit channel of any respective T/R element of the plurality of T/R elements is configured to receive a transmit signal to be provided to the respective T/R element's respective radiating element; and the active cancellation signal at the first T/R element is configured to cancel at least one coupling effect that appears at the first T/R element and that is caused by the respective T/R element.

15. The STAR system of claim 11, wherein:

the antenna array further comprises transmit channels and receive channels; and the active cancellation signal for each respective T/R element is based at least in part on a coupling matrix for the antenna array and on at least one characterization of at least one of the transmit channels and the receive channels of the antenna array.

16. The STAR system of claim 11, wherein:

the active cancellation signal for each respective T/R element is based at least in part on one or more parameters out of a set of parameters measured and determined during a calibration of the antenna array; and the set of parameters comprises a maximum delay necessary to fully characterize signal coupling in the antenna array, a receive element number, a transmit element number, one or more characterized feedback paths, one or more characterized coupling matrix values, knowledge of an antenna array channel's characterization, knowledge of a commanded excitation for each antenna element at a given time sample, and one or more antenna array channel transmit output signals.

17. A method for simultaneous transmit and receive (STAR) operation, comprising:

operating a system comprising (i) a plurality of radiating elements configured as part of an antenna array, the antenna array configured for transmitting signals and for receiving signals, and (ii) a plurality of antenna transmit/receive (T/R) elements coupled to be in operable communication with the plurality of radiating elements, wherein:

each respective T/R element is in operable communication with a respective radiating element;

each respective T/R element comprises a first transmit channel, a receive channel, a switch, and a directional coupler; and for each respective T/R element:

the directional coupler comprises a radiofrequency (RF) input in operable communication with the antenna array to receive signals received by the antenna array, an RF output configured to couple the received signals to an input of the receive channel, and a coupled input in operable communication with the switch; and the switch comprises an input in operable communication with an output of the first transmit channel, a transmit pole in operable communication with the respective radiating element, and a feedback pole in operable communication with the coupled input of the directional coupler;

setting, for at least a first T/R element of the plurality of T/R elements, the switch of the first T/R element to the transmit pole to cause an output of the first transmit channel of the first T/R element to be provided to the respective radiating element for the first T/R element;

setting, for at least a second of the plurality of T/R elements, the switch of the second T/R element to the feedback pole to cause an output of the first transmit channel of the second T/R element to be provided to the coupled input of the directional coupler;

providing a transmit signal to an input of the first transmit channel of the first T/R element, wherein the first T/R element provides the transmit signal to its respective radiating element to be radiated into a target area;

receiving, at the antenna array, a received signal that is provided to an input of the receive channel of the second T/R element; and providing an active cancellation signal to an input of the first transmit channel of the second T/R element, wherein the directional coupler of the second T/R element is configured to provide the active cancellation signal to the input of the receive channel of the second T/R element, wherein the active cancellation signal is configured to cancel at least some coupling effects that arise on the input to the receive channel of the second T/R element, the coupling effects arising from providing the transmit signal to the first T/R element, and wherein the active cancellation signal is configured to enable the input to the receive channel to be as close a match as possible to the received signal.

18. The method of claim 17, wherein the active cancellation signal is provided as an input to the first transmit channel of the second T/R element at substantially a same time that the transmit signal is provided as an input to the first transmit channel of the first T/R element.

19. The method of claim 17, wherein:

the antenna array further comprises transmit channels and receive channels; and the active cancellation signal is generated based at least in part on one or more of:

a coupling matrix for the antenna array;

at least one characterization of at least one of the transmit channels and the receive channels of the antenna array; and one or more parameters out of a set of parameters measured and determined during a calibration of the antenna array, the set of parameters comprising a maximum delay necessary to fully characterize signal coupling in the antenna array, a receive element number, a transmit element number, one or more characterized feedback paths, one or more characterized coupling matrix values, knowledge of an antenna array channel's characterization, knowledge of a commanded excitation for each antenna element at a given time sample, and one or more antenna array channel transmit output signals.

20. The method of claim 17, wherein:

each respective T/R element further comprises a second transmit channel having an input configured to receive the active cancellation signal and an output configured to couple the active cancellation signal to the directional coupler; and the method further comprises:

receiving, at the input of the second transmit channel of the first T/R element, the active cancellation signal, wherein the active cancellation signal is received at substantially a same time that the transmit signal is provided to the input of the first transmit channel of the first T/R element; and configuring the active cancellation signal to cancel at least one coupling effect that appears at the first T/R element and that is caused by any other T/R element.

* * * * *